United States Patent
Porat et al.

(10) Patent No.: US 10,411,849 B2
(45) Date of Patent: Sep. 10, 2019

(54) BEAMFORMING FEEDBACK TONE/SUB-CARRIER LOCATION WITHIN WIRELESS COMMUNICATIONS

(71) Applicant: Avago Technologies International Sales Pte. Limited, Singapore (SG)

(72) Inventors: Ron Porat, San Diego, CA (US); Sriram Venkateswaran, Mountain View, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 16/271,284

(22) Filed: Feb. 8, 2019

(65) Prior Publication Data
US 2019/0190664 A1 Jun. 20, 2019

Related U.S. Application Data

(63) Continuation of application No. 15/895,261, filed on Feb. 13, 2018, now Pat. No. 10,237,026, which is a
(Continued)

(51) Int. Cl.
*H04L 5/00* (2006.01)
*H04W 72/04* (2009.01)
(Continued)

(52) U.S. Cl.
CPC ............ *H04L 5/001* (2013.01); *H04B 7/0408* (2013.01); *H04B 7/0452* (2013.01);
(Continued)

(58) Field of Classification Search
CPC ....... H04L 5/001; H04L 5/007; H04L 5/0023; H04L 5/0041; H04L 5/0048;
(Continued)

(56) References Cited

U.S. PATENT DOCUMENTS 8,644,368 B1 2/2014 Zhang et al.
2014/0301240 A1 10/2014 Park et al.
(Continued)

*Primary Examiner* — Duc C Ho
(74) *Attorney, Agent, or Firm* — Garlick & Markison; Randy W. Lacasse

(57) ABSTRACT

An access point (AP) includes at least one processing circuitry configured to support communications with other WDEV(s) and to generate and process signals for such communications. In some examples, the device includes a communication interface and a processing circuitry, among other possible circuitries, components, elements, etc. to support communications with other WDEV(s) and to generate and process signals for such communications. The WDEV transmits a null data packet (NDP) announcement frame that specifies a sub-carrier (SC) or tone grouping factor, a communication channel bandwidth, and other WDEV(s) to respond with beamforming feedback. The WDEV process the NDP announcement frame to determine if it is to respond, and if so, then receives an NDP sounding frame that includes long training fields (LTFs) and pilots at predetermined locations and generates beamforming feedback of communication channel estimates at SCs as determined based on a sub-carrier roster look up table (LUT).

18 Claims, 10 Drawing Sheets

Related U.S. Application Data continuation of application No. 15/261,513, filed on Sep. 9, 2016, now Pat. No. 9,923,680, which is a continuation of application No. 15/142,431, filed on Apr. 29, 2016, now Pat. No. 9,774,428.

(60) Provisional application No. 62/247,701, filed on Oct. 28, 2015, provisional application No. 62/319,487, filed on Apr. 7, 2016, provisional application No. 62/382,035, filed on Aug. 31, 2016, provisional application No. 62/170,618, filed on Jun. 3, 2015, provisional application No. 62/188,426, filed on Jul. 2, 2015, provisional application No. 62/212,723, filed on Sep. 1, 2015, provisional application No. 62/327,597, filed on Apr. 26, 2016, provisional application No. 62/327,904, filed on Apr. 26, 2016.

(51) Int. Cl.
| | | |
|---|---|---|
| *H04B 7/06* | (2006.01) | |
| *H04L 27/26* | (2006.01) | |
| *H04L 12/46* | (2006.01) | |
| *H04L 12/28* | (2006.01) | |
| *H04B 7/0452* | (2017.01) | |
| *H04B 7/0408* | (2017.01) | |
| *H04L 25/02* | (2006.01) | |

(52) U.S. Cl.
CPC ......... *H04B 7/0617* (2013.01); *H04B 7/0636* (2013.01); *H04L 5/0007* (2013.01); *H04L 5/0023* (2013.01); *H04L 5/0041* (2013.01); *H04L 5/0048* (2013.01); *H04L 5/0064* (2013.01); *H04L 5/0094* (2013.01); *H04L 12/2854* (2013.01); *H04L 12/4604* (2013.01); *H04L 25/02* (2013.01); *H04L 27/261* (2013.01); *H04L 27/2602* (2013.01); *H04W 72/0453* (2013.01)

(58) Field of Classification Search
CPC . H04L 5/0064; H04L 5/0094; H04L 12/2854; H04L 12/4604; H04L 25/02; H04L 27/2602; H04L 27/261; H04B 7/0408; H04B 7/0452; H04B 7/0617; H04B 7/0636; H04W 72/0453

See application file for complete search history.

(56) References Cited

U.S. PATENT DOCUMENTS

| | | | |
|---|---|---|---|
| 2015/0326340 A1 | 11/2015 | Huang | |
| 2016/0036572 A1* | 2/2016 | Bhanage | H04L 5/0048 370/329 |
| 2016/0211957 A1 | 7/2016 | Kenney et al. | |
| 2016/0301452 A1* | 10/2016 | Kwon | H04B 7/0421 |
| 2017/0111148 A1 | 4/2017 | Park et al. | |

* cited by examiner

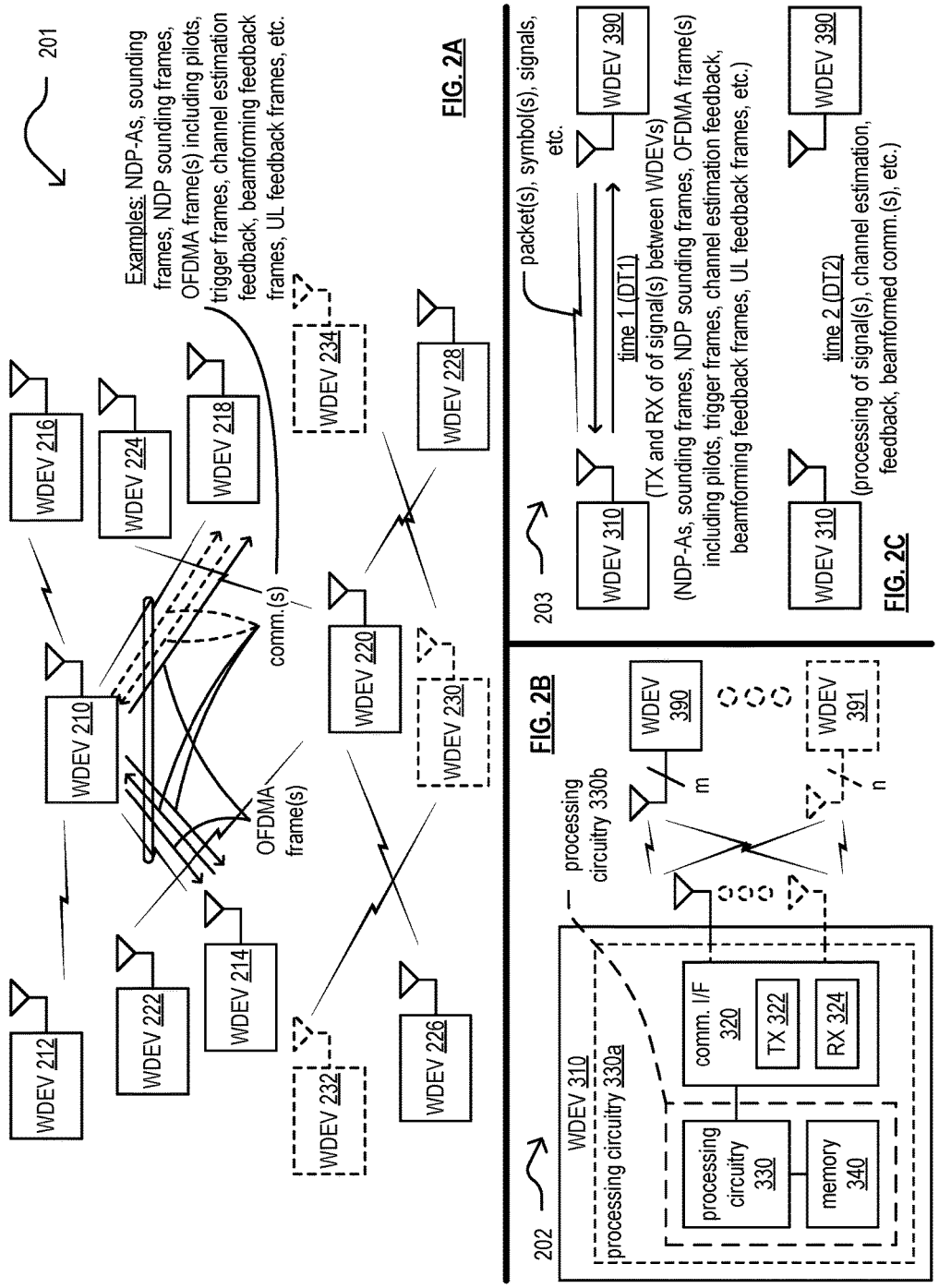

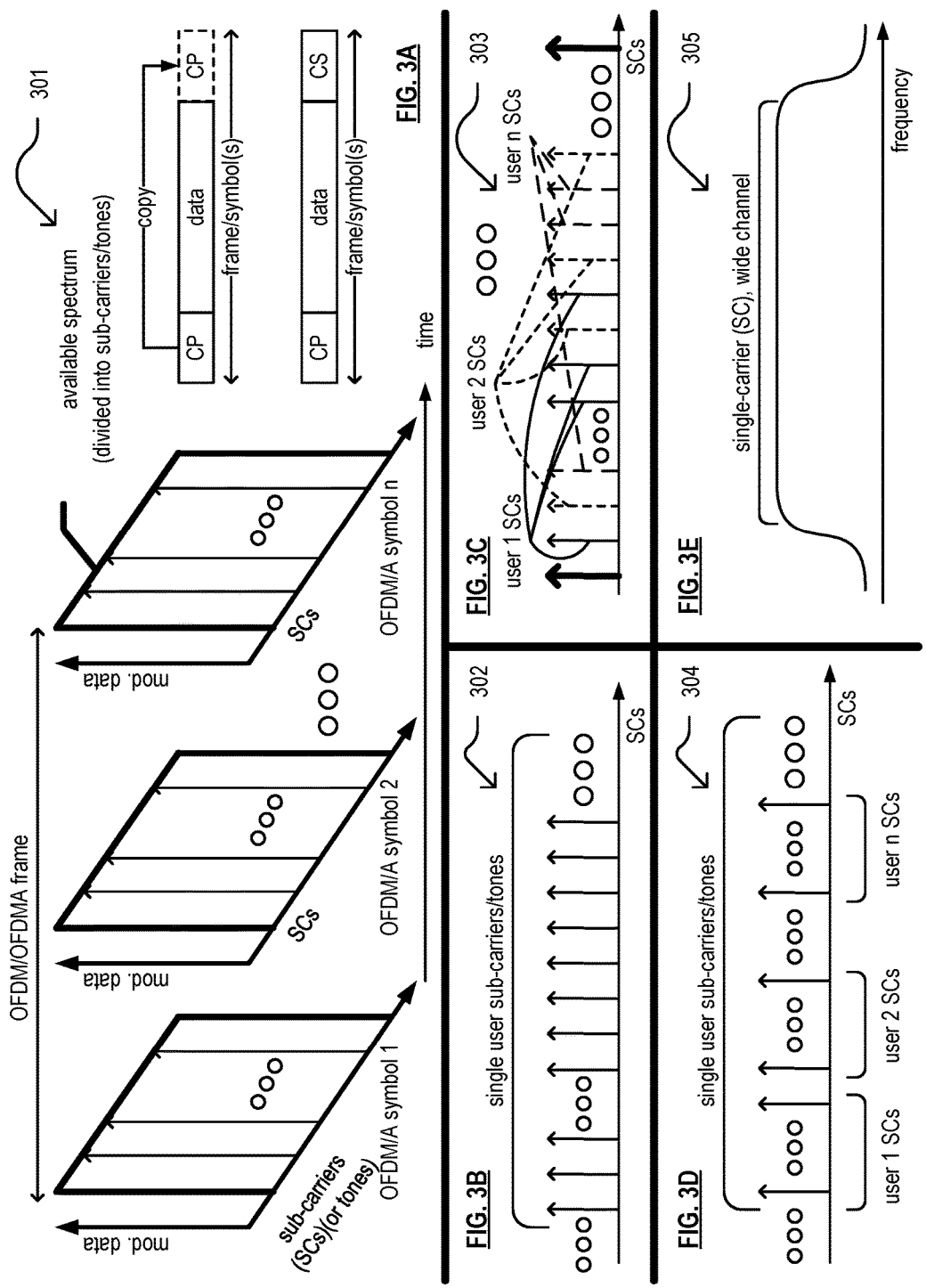

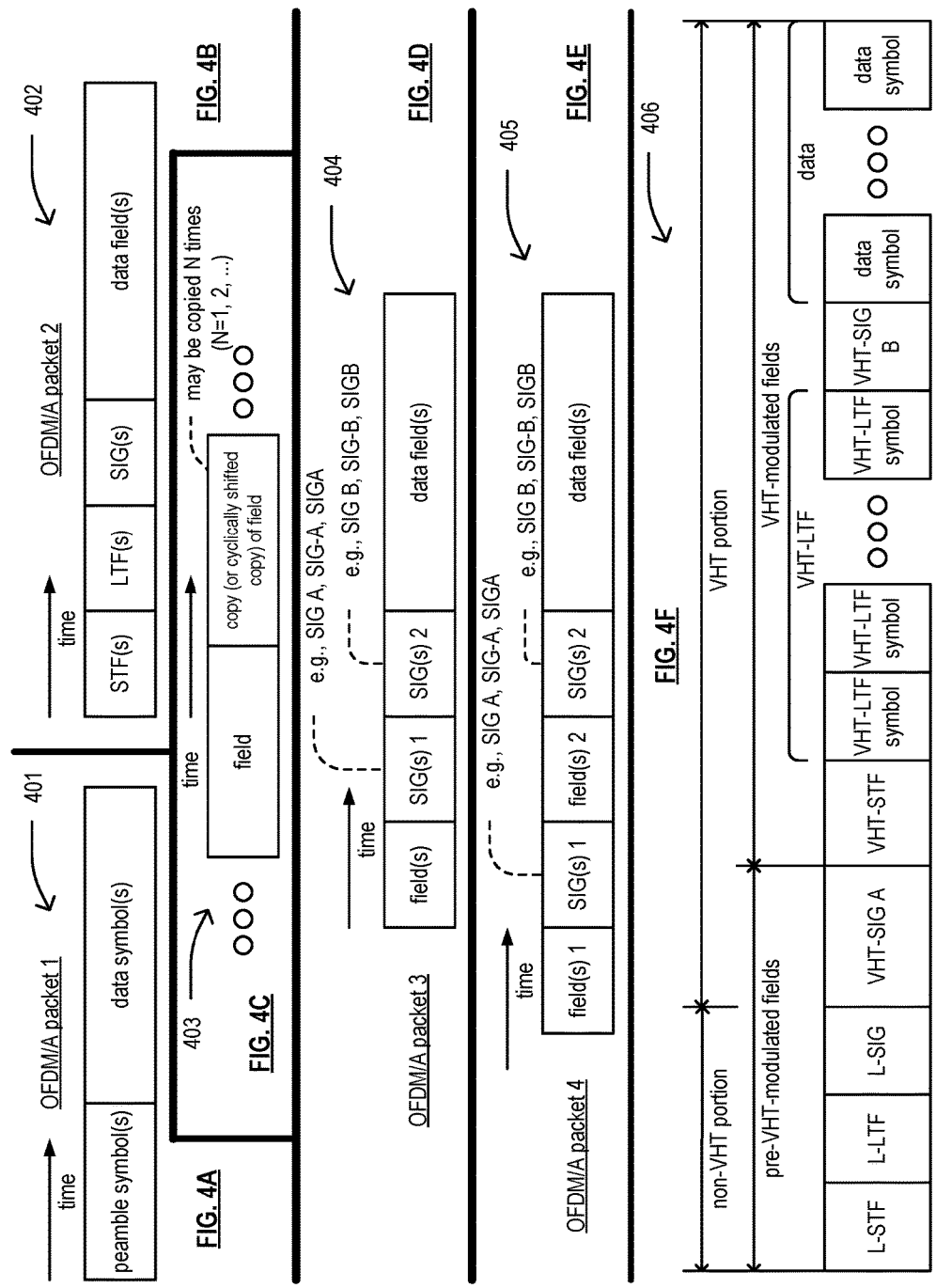

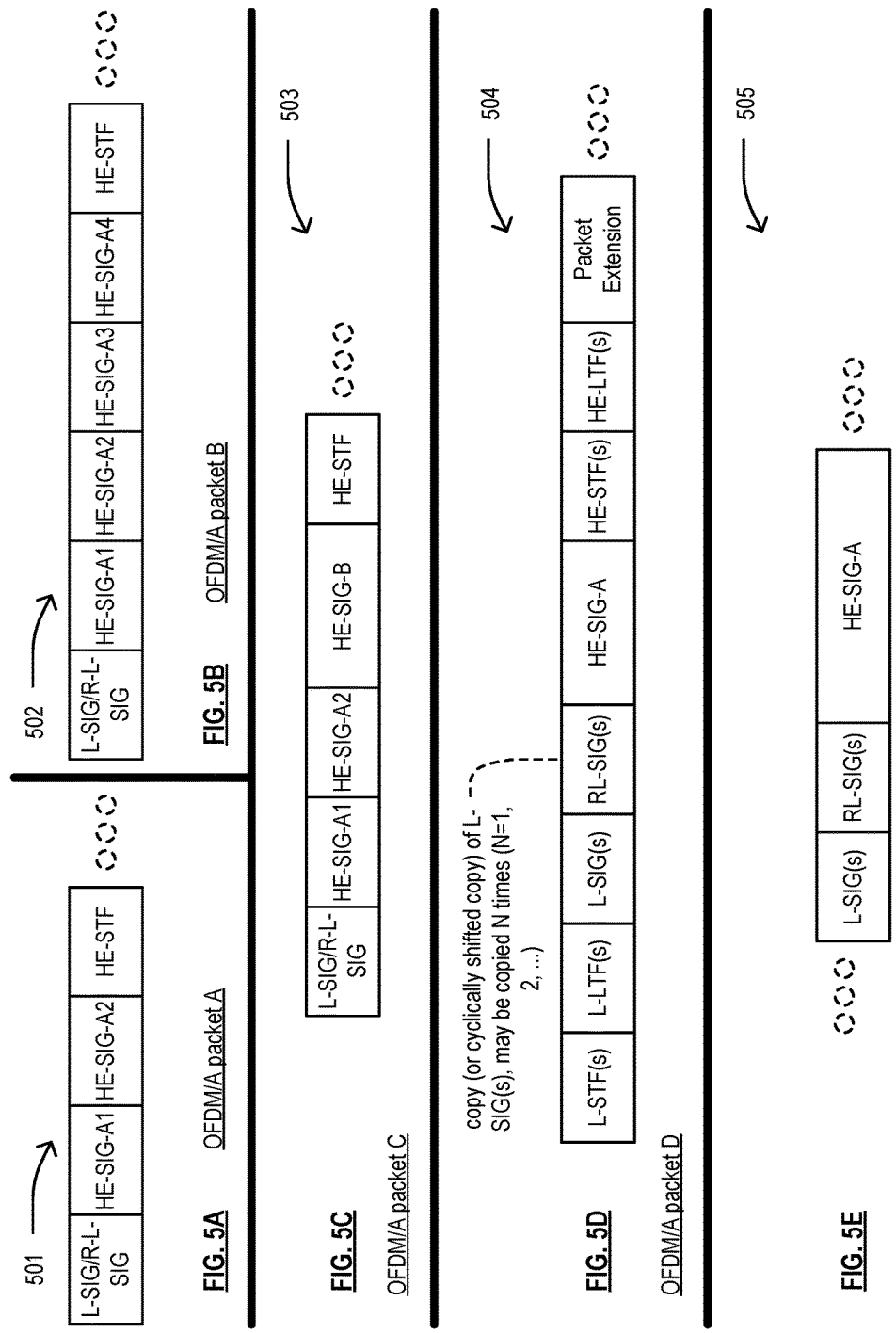

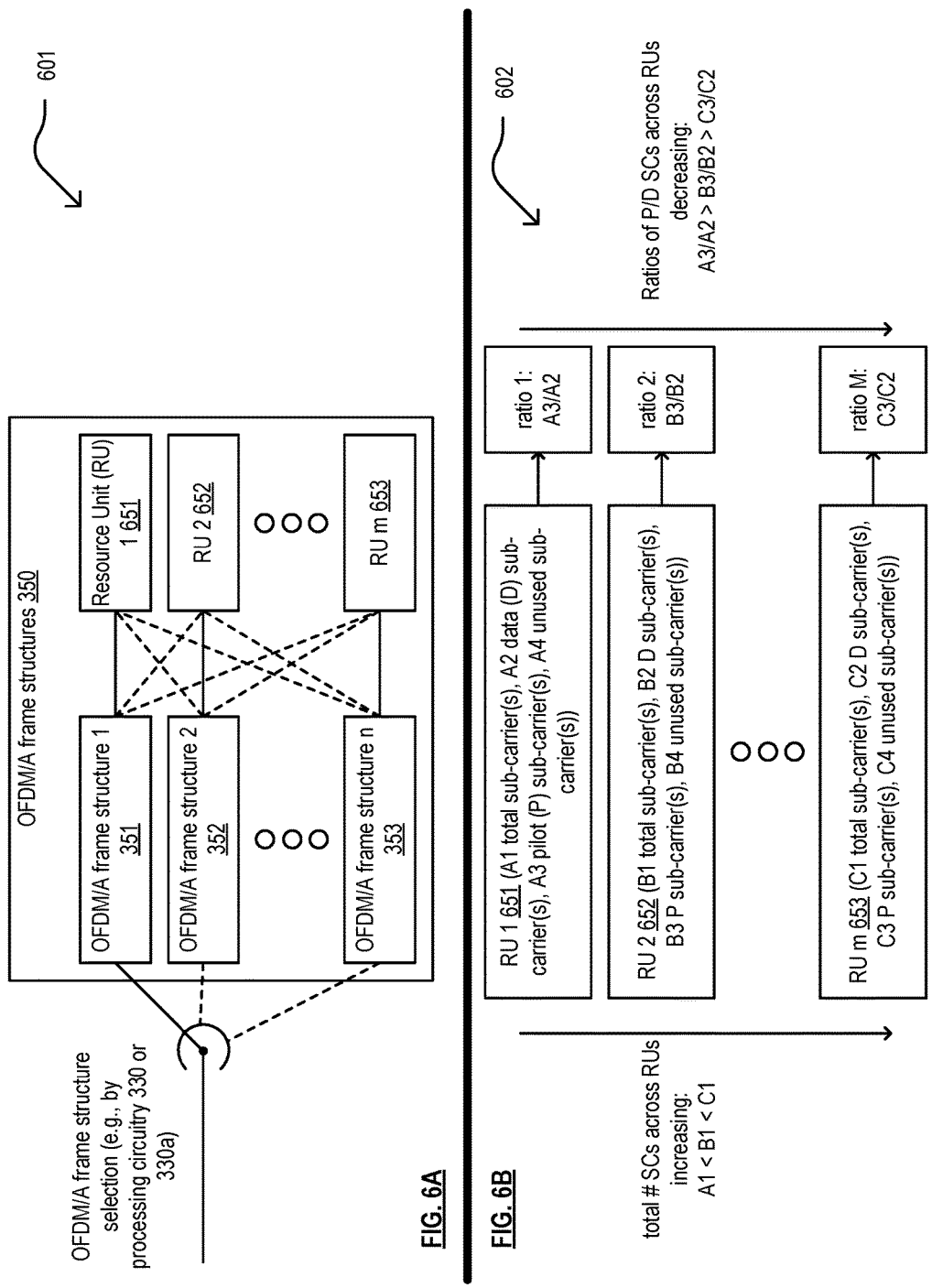

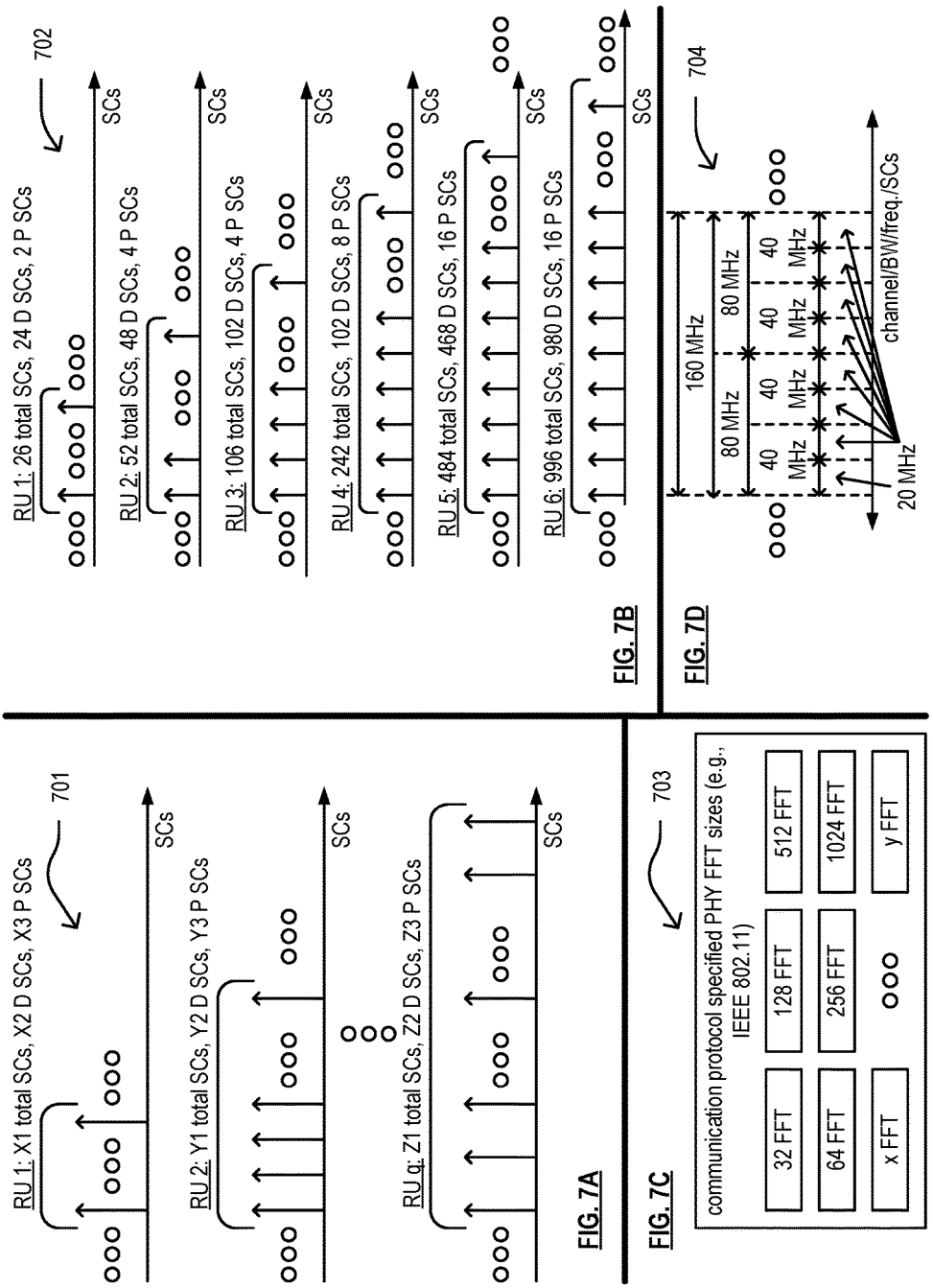

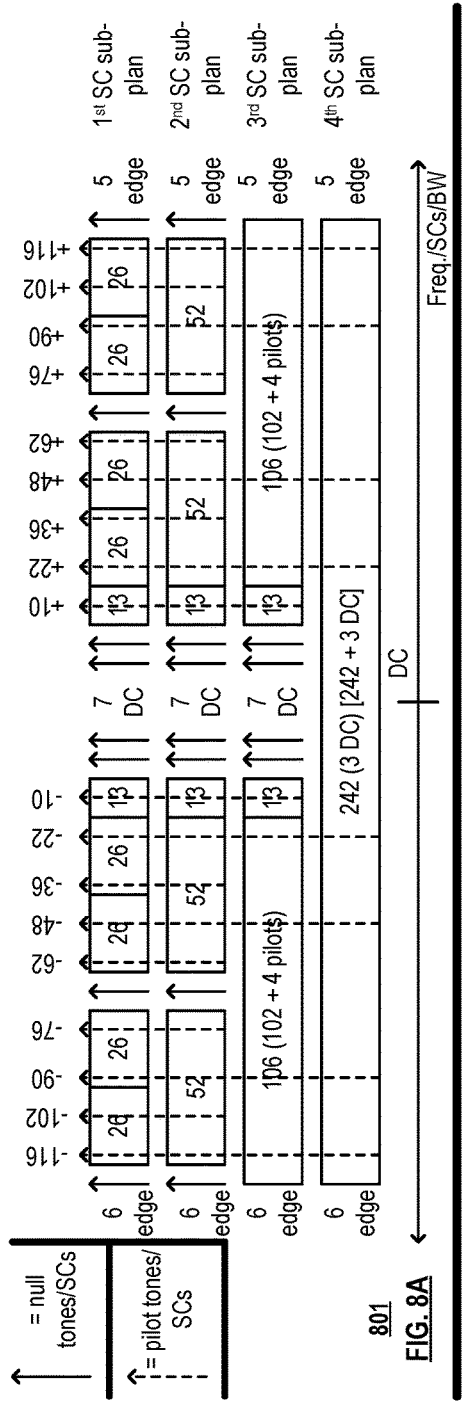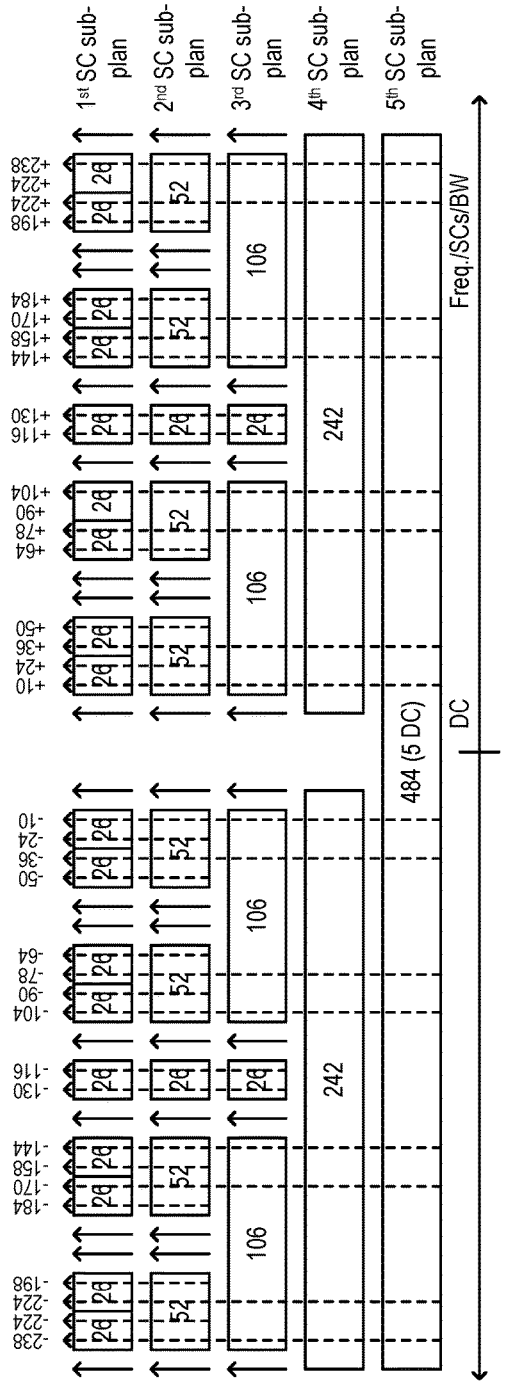
FIG. 8A 801
FIG. 8B 802

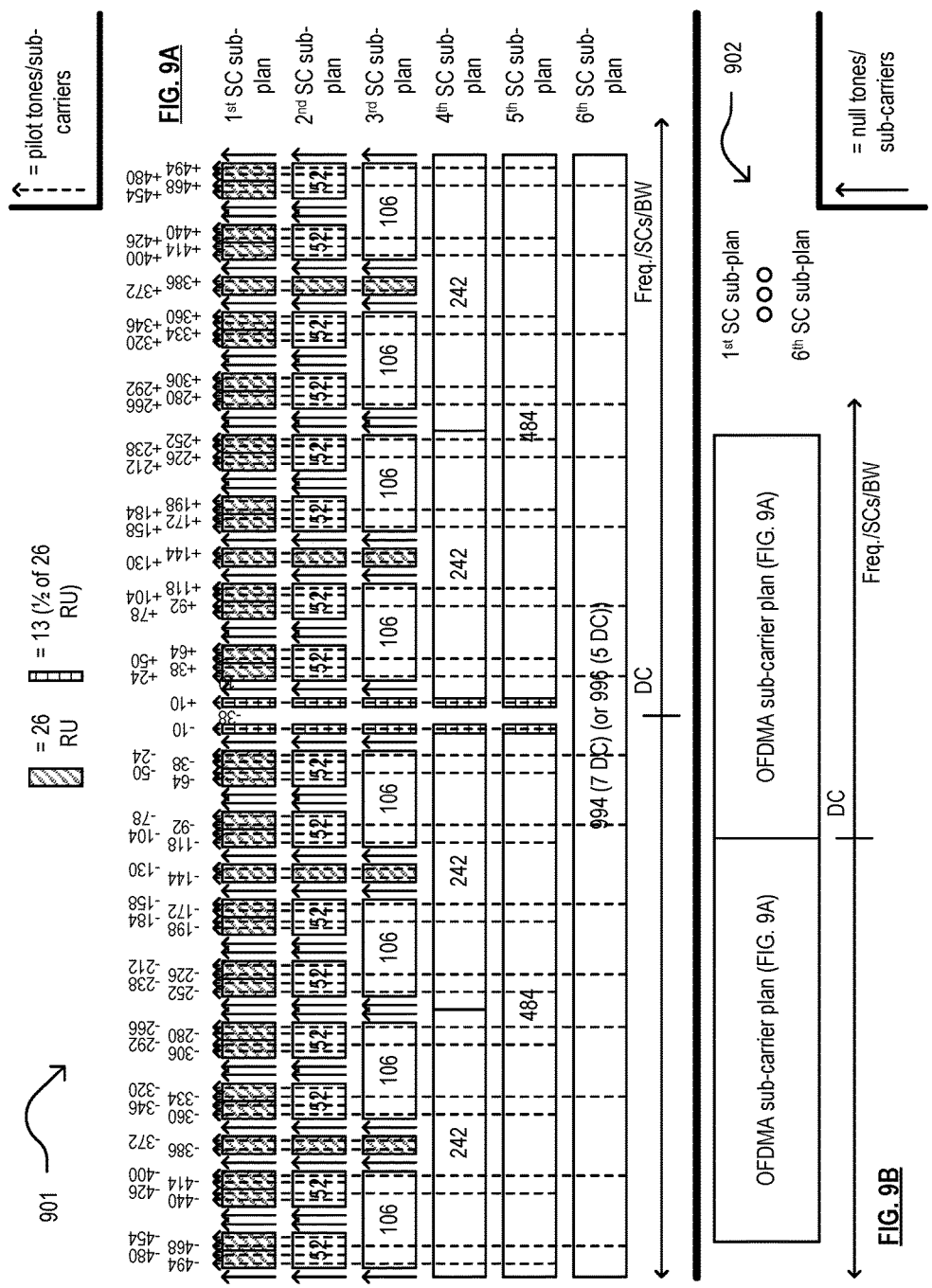

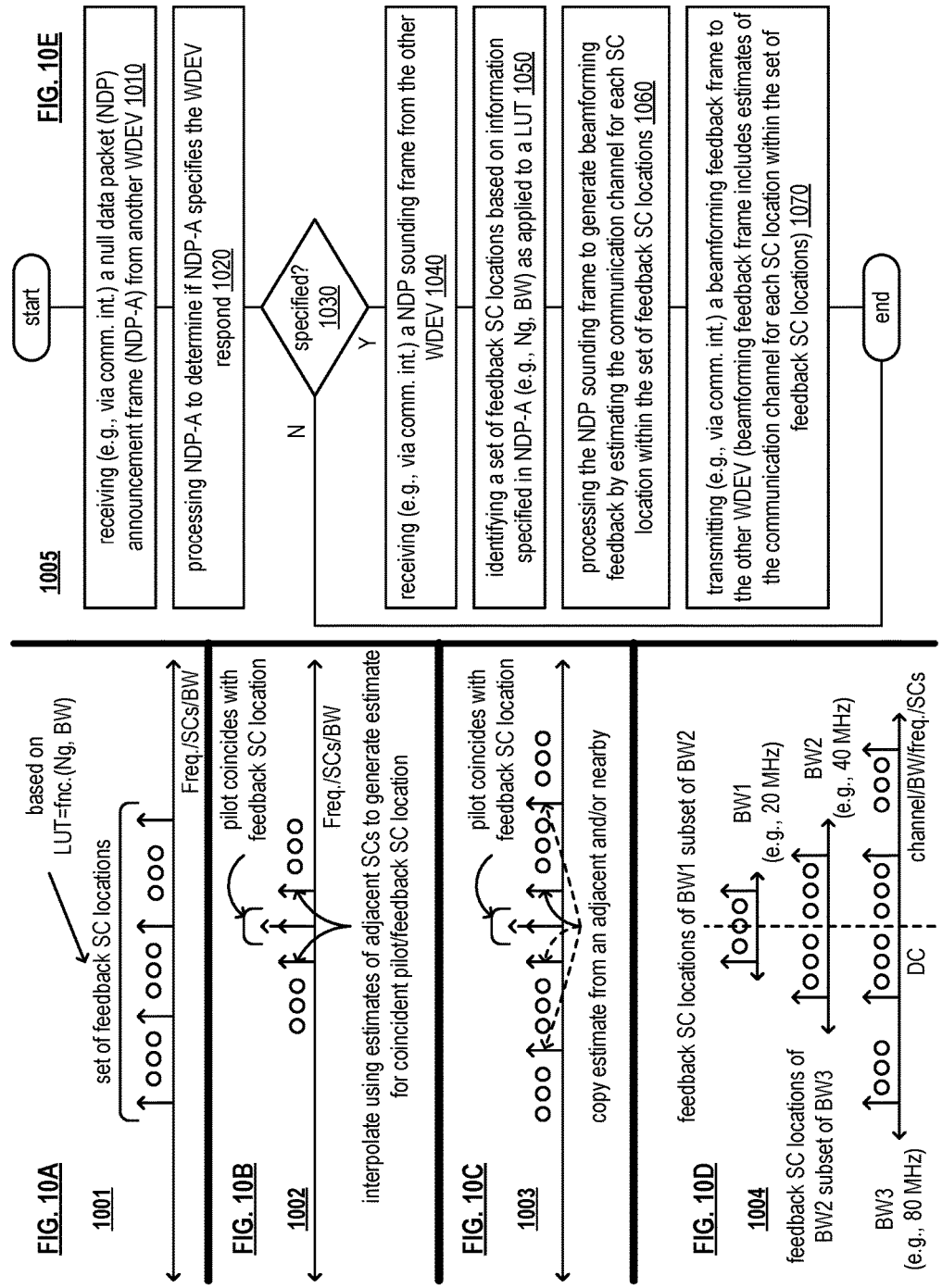

BEAMFORMING FEEDBACK TONE/SUB-CARRIER LOCATION WITHIN WIRELESS COMMUNICATIONS

CROSS REFERENCE TO RELATED PATENTS/PATENT APPLICATIONS

The present U.S. Utility Patent Application claims priority pursuant to 35 U.S.C. § 120, as a continuation, to U.S. Utility patent application Ser. No. 15/895,261, entitled "Beamforming feedback tone/sub-carrier location within wireless communications," filed Feb. 13, 2018, which is a continuation to U.S. Utility patent application Ser. No. 15/261,513, entitled "Beamforming feedback tone/sub-carrier location within wireless communications," filed Sep. 9, 2016, issued as U.S. Pat. No. 9,923,680 on Mar. 20, 2018, which claims priority pursuant to 35 U.S.C. § 119(e) to U.S. Provisional Application No. 62/247,701, entitled "Beamforming feedback tone/sub-carrier location within wireless communications," filed Oct. 28, 2015; U.S. Provisional Application No. 62/319,487, entitled "Beamforming feedback tone/sub-carrier location within wireless communications," filed Apr. 7, 2016; and U.S. Provisional Application No. 62/382,035, entitled "Beamforming feedback tone/sub-carrier location within wireless communications," filed Aug. 31, 2016, all of which are hereby incorporated herein by reference in their entirety and made part of the present U.S. Utility Patent Application for all purposes.

The U.S. Utility patent application Ser. No. 15/261,513, entitled "Beamforming feedback tone/sub-carrier location within wireless communications," filed Sep. 9, 2016, issued as U.S. Pat. No. 9,923,680 on Mar. 20, 2018, also claims priority pursuant to 35 U.S.C. § 120, as a continuation-in-part (CIP), to U.S. Utility patent application Ser. No. 15/142,431, entitled "Pilot plan and design within OFDM/OFDMA wireless communications," filed Apr. 29, 2016, issued as U.S. Pat. No. 9,774,428 on Sep. 26, 2017, which claims priority pursuant to 35 U.S.C. § 119(e) to U.S. Provisional Application No. 62/170,618, entitled "Sub-carrier or tone plan and design within OFDM/OFDMA wireless communications," filed Jun. 3, 2015; U.S. Provisional Application No. 62/188,426, entitled "Sub-carrier or tone plan and design within OFDM/OFDMA wireless communications," filed Jul. 2, 2015; U.S. Provisional Application No. 62/212,723, entitled "Sub-carrier or tone plan and design within OFDM/OFDMA wireless communications," filed Sep. 1, 2015; U.S. Provisional Application No. 62/327,597, entitled "Sub-carrier or tone plan and design within OFDM/OFDMA wireless communications," filed Apr. 26, 2016; and U.S. Provisional Application No. 62/327,904, entitled "Pilot plan and design within OFDM/OFDMA wireless communications," filed Apr. 26, 2016; all of which are hereby incorporated herein by reference in their entirety and made part of the present U.S. Utility Patent Application for all purposes.

INCORPORATION BY REFERENCE

The following U.S. Utility Patent Application is hereby incorporated herein by reference in its entirety and made part of the present U.S. Utility Patent Application for all purposes:

1. U.S. Utility patent application Ser. No. 15/142,283, entitled "Sub-carrier or tone plan and design within OFDM/OFDMA wireless communications," filed on Apr. 29, 2016, issued as U.S. Pat. No. 10,003,441 on Jun. 19, 2018.

BACKGROUND

Technical Field

The present disclosure relates generally to communication systems; and, more particularly, to beamforming related communications within single user, multiple user, multiple access, and/or MIMO wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

The number of wireless communication devices implemented and concurrently operative within wireless communication systems continues to increase and presents significant challenges for sharing the communication medium. The prior art does not provide adequate means by which multiple devices can operate efficiently within such communication systems. The prior art also does not provide adequate means by which coordination may be made between various wireless communication devices within such wireless communication systems.

BRIEF DESCRIPTION OF THE SEVERAL VIEWS OF THE DRAWINGS

FIG. 2A is a diagram illustrating an embodiment of dense deployment of wireless communication devices.

FIG. 2B is a diagram illustrating an example of communication between wireless communication devices.

FIG. 2C is a diagram illustrating another example of communication between wireless communication devices.

FIG. 3A is a diagram illustrating an example of orthogonal frequency division multiplexing (OFDM) and/or orthogonal frequency division multiple access (OFDMA).

FIG. 3B is a diagram illustrating another example of OFDM and/or OFDMA.

FIG. 3C is a diagram illustrating another example of OFDM and/or OFDMA.

FIG. 3D is a diagram illustrating another example of OFDM and/or OFDMA.

FIG. 3E is a diagram illustrating an example of single-carrier (SC) signaling.

FIG. 4A is a diagram illustrating an example of an OFDM/A packet.

FIG. 4B is a diagram illustrating another example of an OFDM/A packet of a second type.

FIG. 4C is a diagram illustrating an example of at least one portion of an OFDM/A packet of another type.

FIG. 4D is a diagram illustrating another example of an OFDM/A packet of a third type.

FIG. 4E is a diagram illustrating another example of an OFDM/A packet of a fourth type.

FIG. 4F is a diagram illustrating another example of an OFDM/A packet.

FIG. 5A is a diagram illustrating another example of an OFDM/A packet.

FIG. 5B is a diagram illustrating another example of an OFDM/A packet.

FIG. 5C is a diagram illustrating another example of an OFDM/A packet.

FIG. 5D is a diagram illustrating another example of an OFDM/A packet.

FIG. 5E is a diagram illustrating another example of an OFDM/A packet.

FIG. 6A is a diagram illustrating an example of selection among different OFDM/A frame structures for use in communications between wireless communication devices and specifically showing OFDM/A frame structures corresponding to one or more resource units (RUs).

FIG. 6B is a diagram illustrating an example of various types of different resource units (RUs).

FIG. 7A is a diagram illustrating another example of various types of different RUs.

FIG. 7B is a diagram illustrating another example of various types of different RUs.

FIG. 7C is a diagram illustrating an example of various types of communication protocol specified physical layer (PHY) fast Fourier transform (FFT) sizes.

FIG. 7D is a diagram illustrating an example of different channel bandwidths and relationship there between.

FIG. 8A is a diagram illustrating an example of a tone/sub-carrier plan showing pilot locations therein.

FIG. 8B is a diagram illustrating another example of a tone/sub-carrier plan showing pilot locations therein.

FIG. 9A is a diagram illustrating another example of a tone/sub-carrier plan showing pilot locations therein.

FIG. 9B is a diagram illustrating another example of a tone/sub-carrier plan showing pilot locations therein.

FIG. 10A is a diagram illustrating an example of a set of feedback sub-carrier (SC) locations.

FIG. 10B is a diagram illustrating an example of a feedback SC location coinciding with a pilot.

FIG. 10C is a diagram illustrating another example of a feedback SC location coinciding with a pilot.

FIG. 10D is a diagram illustrating an example of feedback SC locations for different respective channel bandwidths (BWs).

FIG. 10E is a diagram illustrating an embodiment of a method for execution by one or more wireless communication devices.

DETAILED DESCRIPTION

Figure 1:
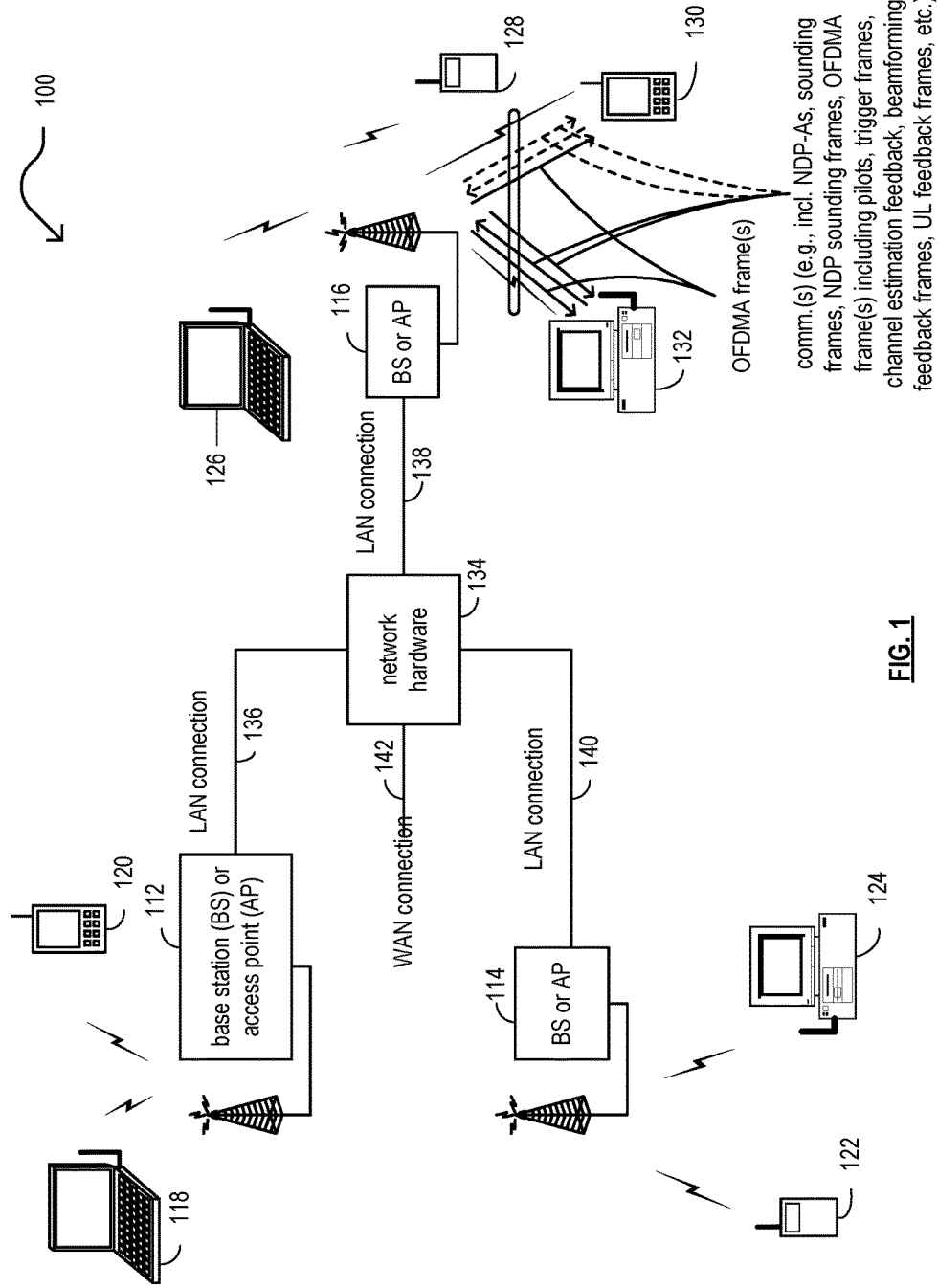
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. Other examples of such wireless communication devices 118-132 could also or alternatively include other types of devices that include wireless communication capability. The details of an embodiment of such wireless communication devices are described in greater detail with reference to FIG. 2B among other diagrams.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processing circuitry and/or a communication interface to support communications with any other of the wireless communication devices 118-132 and BSs or APs 112-116. In an example of operation, a processing circuitry and/or a communication interface implemented within one of the devices (e.g., any one of the WDEVs 118-132 and BSs or APs 112-116) is/are configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2A below, "device 210" when referring to "wireless communication device 210" or "WDEV 210," or "devices 210-234" when referring to "wireless communication devices 210-234"; or with respect to FIG. 2B below, use of "device 310" may alternatively be used when referring to "wireless communication device 310", or "devices 390 and 391 (or 390-391)" when referring to wireless communication devices 390 and 391 or WDEVs 390 and 391). Generally, such general references or designations of devices may be used interchangeably.

The processing circuitry and/or the communication interface of any one of the various devices, WDEVs 118-132 and BSs or APs 112-116, may be configured to support communications with any other of the various devices, WDEVs 118-132 and BSs or APs 112-116. Such communications may be uni-directional or bi-directional between devices. Also, such communications may be uni-directional between devices at one time and bi-directional between those devices at another time.

In an example, a device (e.g., any one of the WDEVs 118-132 and BSs or APs 112-116) includes a communication interface and/or a processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, etc. and other operation(s) separately, independently from one another, etc.). In some examples, such a processing circuitry includes all capability, functionality, and/or circuitry, etc. to perform such operations as described herein. In some other examples, such a communication interface includes all capability, functionality, and/or circuitry, etc. to perform such operations as described herein. In even other examples, such a processing circuitry and a communication interface include all capability, functionality, and/or circuitry, etc. to perform such operations as described herein, at least in part, cooperatively with one another.

In an example of implementation and operation, BS or AP 116 includes at least one processing circuitry configured to generate an orthogonal frequency division multiple access (OFDMA) frame that includes at least one OFDMA symbol that includes a set of pilots (e.g., at predetermined locations such as based on an OFDMA sub-carrier plan). The BS or AP 116 then WDEV transmits the OFDMA frame to WDEV 130 and/or the WDEV 132 for use by the WDEV 130 and/or the WDEV 132 to perform estimation of communication pathway(s) between the BS or AP 116 and the at least one other WDEV 130 and/or the WDEV 132 using the set of pilots (e.g., generate beamforming feedback such as for first communication pathway between the BS or AP 116 and the other WDEV 130 and/or a second communication pathway between the BS or AP 116 and the other WDEV 132).

Note that such operations may similarly be performed between the BS or AP 116 and more than one other WDEV, either at the same time or different times (e.g., transmitting the same or different OFDMA frames to both the WDEV 130 and the WDEV 132 at the same time or transmitting different OFDMA frames to the WDEV 130 and the WDEV 132 at different times). In certain examples, the OFDMA sub-carriers are included within a communication channel that has a particular bandwidth (e.g., of 20 MHz, 40 MHz, 80 MHz, or 160 MHz, and/or any other desired bandwidth). In some examples, subsequent communications between the BS or AP 116 and the WDEV 130 and/or the WDEV 132 may include channel estimation feedback provided from the WDEV 130 and/or the WDEV 132 to the BS or AP 116. In addition, subsequent communications from the BS or AP 116 and the WDEV 130 and/or the WDEV 132 may include beamformed communications that are based on the channel estimation feedback and/or beamforming feedback provided from the WDEV 130 and/or the WDEV 132 to the BS or AP 116. For example, the BS or AP 116 transmits a beamformed OFDMA frame to the WDEV 130 and/or the WDEV 132.

In another example of implementation and operation, WDEV 130 receives, via a communication channel and from BS or AP 116, a null data packet (NDP) announcement frame (e.g., alternatively referred to as a NDP-A) that specifies a sub-carrier or tone grouping factor, a communication channel bandwidth of a group of possible communication channel bandwidths, and at least one wireless communication device to respond to the BS or AP 116 with beamforming feedback (e.g., such as the WDEV 130). The WDEV 130 then processes the NDP announcement frame, and when it is determined that the NDP announcement frame specifies WDEV 130 is to respond to the BS or AP 116 with the beamforming feedback, the WDEV 130 receives, via the communication channel and from the BS or AP 116, a NDP sounding frame that includes long training fields (LTFs) and pilots at predetermined locations. The WDEV 130 then identifies a set of feedback sub-carrier locations based on the sub-carrier or tone grouping factor (e.g., Ng) and the communication channel bandwidth specified within the NDP announcement frame as applied to a sub-carrier roster look up table (LUT) that specifies sets of feedback sub-carrier locations based on sub-carrier or tone grouping factors and the communication channel bandwidths. The WDEV 130 then processes the NDP sounding frame to generate the beamforming feedback by estimating the communication channel for each sub-carrier location within the set of feedback sub-carrier locations. The WDEV 130 then transmits, via the communication channel, a beamforming feedback frame to the BS or AP 116 that includes estimates of the communication channel for each sub-carrier location within the set of feedback sub-carrier locations.

FIG. 2A is a diagram illustrating an embodiment 201 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and APs are packed in a given area (e.g., which may be an area [indoor and/or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

In an example of implementation and operation, WDEV 210 generates at least one OFDMA frame that includes at least one OFDMA symbol that includes a set of pilots based on an OFDMA sub-carrier plan. Such an OFDMA frame may be NDP sounding frame that includes long training fields (LTFs) and pilots at predetermined locations in some examples. The WDEV 210 then transmits the OFDMA frame(s) to WDEV 214 and/or the WDEV 218 for use by the WDEV 214 and/or the WDEV 218 to perform estimation of communication pathway(s) between the WDEV 210 and the WDEV 214 and/or the WDEV 218 using the set(s) of pilots within the (e.g., a first communication pathway between the WDEV 210 and the other WDEV 214 and/or a second communication pathway between the WDEV 210 and the other WDEV 218).

In another example of implementation and operation, WDEV 214 receives, via a communication channel and from WDEV 210, a null data packet (NDP) announcement frame (e.g., alternatively referred to as a NDP-A) that specifies a sub-carrier or tone grouping factor, a communication channel bandwidth of a group of possible communication channel bandwidths, and at least one wireless communication device to respond to the WDEV 210 with beamforming feedback (e.g., such as the WDEV 214). The WDEV 214 then processes the NDP announcement frame, and when it is determined that the NDP announcement frame specifies WDEV 214 is to respond to the WDEV 210 with the beamforming feedback, the WDEV 214 receives, via the communication channel and from the WDEV 210, a NDP sounding frame that includes long training fields (LTFs) and pilots at predetermined locations. The WDEV 214 then identifies a set of feedback sub-carrier locations based on the sub-carrier or tone grouping factor (e.g., Ng) and the communication channel bandwidth specified within the NDP announcement frame as applied to a sub-carrier roster look up table (LUT) that specifies sets of feedback sub-carrier locations based on sub-carrier or tone grouping factors and the communication channel bandwidths.

The WDEV 214 then processes the NDP sounding frame to generate the beamforming feedback by estimating the communication channel for each sub-carrier location within the set of feedback sub-carrier locations. The WDEV 214 then transmits, via the communication channel, a beamforming feedback frame to the WDEV 210 that includes estimates of the communication channel for each sub-carrier location within the set of feedback sub-carrier locations.

FIG. 2B is a diagram illustrating an example 202 of communication between wireless communication devices. A wireless communication device 310 (e.g., which may be any one of devices 118-132 as with reference to FIG. 1) is in communication with another wireless communication device 390 (and/or any number of other wireless communication devices up through another wireless communication device 391) via a transmission medium. The wireless communication device 310 includes a communication interface 320 to perform transmitting and receiving of at least one signal, symbol, packet, frame, etc. (e.g., using a transmitter 322 and a receiver 324) (note that general reference to packet or frame may be used interchangeably).

Generally speaking, the communication interface 320 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the device 310 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the wireless communication device 310 also includes a processing circuitry 330, and an associated memory 340, to execute various operations including interpreting at least one signal, symbol, packet, and/or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and/or 391 may each include one or more antennas for transmitting and/or receiving of at least one packet or frame (e.g., WDEV 390 may include m antennae, and WDEV 391 may include n antennae).

Also, in some examples, note that one or more of the processing circuitry 330, the communication interface 320 (including the TX 322 and/or RX 324 thereof), and/or the memory 340 may be implemented in one or more "processing modules," "processing circuits," "processors," and/or "processing units" or their equivalents. Considering one example, one processing circuitry 330a may be implemented to include the processing circuitry 330, the communication interface 320 (including the TX 322 and/or RX 324 thereof), and the memory 340. Considering another example, one processing circuitry 330b may be implemented to include the processing circuitry 330 and the memory 340 yet the communication interface 320 is a separate circuitry.

Considering even another example, two or more processing circuitries may be implemented to include the processing circuitry 330, the communication interface 320 (including the TX 322 and/or RX 324 thereof), and the memory 340. In such examples, such a "processing circuitry" or "processing circuitries" (or "processor" or "processors") is/are configured to perform various operations, functions, communications, etc. as described herein. In general, the various elements, components, etc. shown within the device 310 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the device 310 includes both processing circuitry 330 and communication interface 320 configured to perform various operations. In other examples, the device 310 includes processing circuitry 330a configured to perform various operations. In even other examples, the device 310 includes processing circuitry 330b configured to perform various operations. Generally, such operations include generating, transmitting, etc. signals intended for one or more other devices (e.g., device 390 through 391) and receiving, processing, etc. other signals received for one or more other devices (e.g., device 390 through 391).

In some examples, note that the communication interface 320, which is coupled to the processing circuitry 330, that is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the device 310 may be communicated via any of these types of communication systems.

FIG. 2C is a diagram illustrating another example 203 of communication between wireless communication devices. In an example of operation and implementation, at or during a first time (e.g., time 1 (□T1)), the WDEV 310 transmits signal(s) (e.g., NDP-As, sounding frames, NDP sounding frames, OFDMA frame(s) including pilots, trigger frames, channel estimation feedback, beamforming feedback frames, UL feedback frames, etc.) to WDEV 390, and/or the WDEV 390 transmits other signal(s) to WDEV 310. At or during a second time (e.g., time 2 (□T2)), the WDEV 310 processes signal(s) (e.g., NDP-As, sounding frames, NDP sounding frames, OFDMA frame(s) including pilots, trigger frames, channel estimation feedback, beamforming feedback frames, UL feedback frames, etc.) received from WDEV 390, and/or the WDEV 390 processes signal(s) received from WDEV 310 (e.g., such as by processing of signal(s), channel estimation, feedback, beamformed communications, etc.).

In another example of implementation and operation, WDEV 310 generates at least one OFDMA frame that includes at least one OFDMA symbol that includes at least one set of pilots based on an OFDMA sub-carrier plan. The WDEV 310 then transmits the OFDMA frame(s) to WDEV 390 (and/or the WDEV 391) for use by the WDEV 390 (and/or the WDEV 391) to perform estimation of communication pathway(s) between the WDEV 390 (and/or the WDEV 391) using the set(s) of pilots.

Note that different OFDMA frames with different structures and including different RUs may be transmitted from the WDEV 310 to the WDEV 390 (and/or WDEV 391) at the same or different times (e.g., a first OFDMA frame with first pilots for use by the WDEV 390 at or during a first time and a second OFDMA frame with second pilots for use by the WDEV 390 at or during a second time, or alternatively a single OFDMA frame with pilots for use by both the WDEV 390 and the WDEV 391, or alternatively a first OFDMA frame with first pilots for use by the WDEV 390 at or during a first time and a second OFDMA frame with second pilots for use by the WDEV 391 at or during a second time, and/or any other different combination thereof, etc.).

In even another example of implementation and operation, WDEV 390 receives, via a communication channel and from WDEV 310, a null data packet (NDP) announcement frame that specifies a sub-carrier or tone grouping factor, a communication channel bandwidth (e.g., of a number of possible or optional communication channel bandwidths), and at least one wireless communication device to respond to the WDEV 310 with beamforming feedback (e.g., such as the WDEV 390). The WDEV 390 then process the NDP announcement frame, and when it is determined that the NDP announcement frame specifies WDEV 390 is to respond to the WDEV 310 with the beamforming feedback, the WDEV 390 then receives, via the communication channel and from the WDEV 310, a NDP sounding frame that includes long training fields (LTFs) and pilots at predetermined locations (e.g., such as based on an OFDMA sub-carrier plan known by both the WDEV 310 and the WDEV 390). The WDEV 390 then identifies a set of feedback sub-carrier locations based on the sub-carrier or tone grouping factor and the communication channel bandwidth specified within the NDP announcement frame as applied to a sub-carrier roster look up table (LUT) that specifies sets of feedback sub-carrier locations based on sub-carrier or tone grouping factors and the communication channel bandwidths. Examples of such sub-carrier roster look up table LUTs are provided below. The WDEV 390 then processes the NDP sounding frame to generate the beamforming feedback by estimating the communication channel for each sub-carrier location within the set of feedback sub-carrier locations. The WDEV 390 then transmits, via the communication channel, a beamforming feedback frame to the WDEV 310 that includes estimates of the communication channel for each sub-carrier location within the set of feedback sub-carrier locations.

In some examples, for a feedback sub-carrier location within the set of feedback sub-carrier locations that coincides with a pilot of the pilots at the predetermined locations, the WDEV 390 also processes the NDP sounding frame to generate the beamforming feedback for a feedback sub-carrier location within the set of feedback sub-carrier locations that coincides with the pilot of the pilots at the predetermined locations by interpolating estimates of the communication channel at two sub-carrier locations adjacent to the pilot.

In even other examples, for a feedback sub-carrier location within the set of feedback sub-carrier locations that coincides with a pilot of the pilots at the predetermined locations, the WDEV 390 also processes the NDP sounding frame to generate the beamforming feedback for a feedback sub-carrier location within the set of feedback sub-carrier locations that coincides with the pilot of the pilots at the predetermined locations by copying an estimate of the communication channel from a sub-carrier location that is adjacent to the pilot.

In another example of operation, the WDEV 390 receives, via the communication channel and from the WDEV 310, a trigger frame that specifies a time at which to respond to the WDEV 310 with the beamforming feedback in an uplink (UL) OFDMA frame that also includes at least one other beamforming feedback from at least one other wireless communication device that is specified by the NDP announcement frame to respond to the WDEV 310 with beamforming feedback. The WDEV 390 then transmit the beamforming feedback frame to the WDEV 310 that includes the estimates of the communication channel for the each sub-carrier location within the set of feedback sub-carrier locations as part of the UL OFDMA frame at or during the time specified within the trigger frame.

With respect to the sub-carrier roster LUT, for each of the sub-carrier or tone grouping factors, the sub-carrier roster LUT may be designed to specify a first communication channel bandwidth that includes a 20 MHz communication channel bandwidth and a first corresponding set of feedback sub-carrier locations, a second communication channel bandwidth that includes a 40 MHz communication channel bandwidth and a second corresponding set of feedback sub-carrier locations that is a subset of the first corresponding set of feedback sub-carrier locations, and a third communication channel bandwidth that includes a 80 MHz communication channel bandwidth and a third corresponding set of feedback sub-carrier locations that is a subset of the second corresponding set of feedback sub-carrier locations. For example, FIG. 10D shows one such possible implementation that could be designed according to this option.

In some examples, the pilots are at predetermined locations based on an OFDMA sub-carrier plan. In certain embodiments, such a OFDMA sub-carrier plan is characterized by a first OFDMA sub-carrier sub-plan that includes first RUs of a first sub-carrier size and first pilots at first locations that are substantially uniformly distributed within OFDMA sub-carriers. The OFDMA sub-carrier plan is also characterized by a second OFDMA sub-carrier sub-plan that includes second RUs of a second sub-carrier size that is greater than the first sub-carrier size and second pilots that includes a same number of pilots as the first pilots at second locations that are same as the first locations within the OFDMA sub-carriers, and the OFDMA sub-carrier plan is also characterized by a third OFDMA sub-carrier sub-plan that includes third RUs of a third sub-carrier size that is greater than the second sub-carrier size and third pilots that includes fewer pilots than the second pilots at third locations that include a subset of the first locations within the OFDMA sub-carriers.

In another example of implementation and operation, the WDEV 310 includes both a processing circuitry to perform many of the operations described above and also includes a communication interface, coupled to the processing circuitry, that is configured to support communications within a satellite communication system, a wireless communication system, a wired communication system, a fiber-optic communication system, and/or a mobile communication system. The processing circuitry is configured to transmit signal(s), communication(s), OFDM symbol(s), OFDM packet(s), OFDMA symbol(s), OFDMA packet(s), and/or any other communication(s), etc. to WDEV 390 and/or WDEV 391 via the communication interface. In some examples, the processing circuitry is configured to at receive the NDP announcement frame and/or the NDP sounding frame via the communication interface and/or transmit the beamforming feedback frame via the communication interface.

FIG. 3A is a diagram illustrating an example 301 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Note that sub-carrier or tone may be used interchangeably. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processing circuitry and the communication interface of a communication device may be configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 3B is a diagram illustrating another example 302 of OFDM and/or OFDMA. A transmitting device transmits modulation symbols via the sub-carriers. Note that such modulation symbols may include data modulation symbols, pilot modulation symbols (e.g., for use in channel estimation, characterization, etc.) and/or other types of modulation symbols (e.g., with other types of information included therein). OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a cyclic prefix (CP) and/or cyclic suffix (CS) (shown in right hand side of FIG. 3A) that may be a copy of the CP may also be employed within the guard interval to allow switching time (e.g., such as when jumping to a new communication channel or sub-channel) and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 3C.

FIG. 3C is a diagram illustrating another example 303 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of sub-carriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 3C shows example 303 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 3D is a diagram illustrating another example 304 of OFDM and/or OFDMA. In this example 304, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

FIG. 3E is a diagram illustrating an example 305 of single-carrier (SC) signaling. SC signaling, when compared to OFDM signaling, includes a singular relatively wide channel across which signals are transmitted. In contrast, in OFDM, multiple narrowband sub-carriers or narrowband sub-channels span the available frequency range, bandwidth, or spectrum across which signals are transmitted within the narrowband sub-carriers or narrowband sub-channels.

Generally, a communication device may be configured to include a processing circuitry and the communication interface (or alternatively a processing circuitry, such a processing circuitry 330a and/or processing circuitry 330b shown in FIG. 2B) configured to process received OFDM and/or OFDMA symbols and/or frames (and/or SC symbols and/or frames) and to generate such OFDM and/or OFDMA symbols and/or frames (and/or SC symbols and/or frames).

FIG. 4A is a diagram illustrating an example 401 of an OFDM/A packet. This packet includes at least one preamble symbol followed by at least one data symbol. The at least one preamble symbol includes information for use in identifying, classifying, and/or categorizing the packet for appropriate processing.

FIG. 4B is a diagram illustrating another example 402 of an OFDM/A packet of a second type. This packet also includes a preamble and data. The preamble is composed of at least one short training field (STF), at least one long training field (LTF), and at least one signal field (SIG). The data is composed of at least one data field. In both this example 402 and the prior example 401, the at least one data symbol and/or the at least one data field may generally be referred to as the payload of the packet. Among other purposes, STFs and LTFs can be used to assist a device to identify that a frame is about to start, to synchronize timers, to select an antenna configuration, to set receiver gain, to set up certain the modulation parameters for the remainder of the packet, to perform channel estimation for uses such as beamforming, etc. In some examples, one or more STFs are used for gain adjustment (e.g., such as automatic gain control (AGC) adjustment), and a given STF may be repeated one or more times (e.g., repeated 1 time in one example). In some examples, one or more LTFs are used for channel estimation, channel characterization, etc. (e.g., such as for determining a channel response, a channel transfer function, etc.), and a given LTF may be repeated one or more times (e.g., repeated up to 8 times in one example).

Among other purposes, the SIGs can include various information to describe the OFDM packet including certain attributes as data rate, packet length, number of symbols within the packet, channel width, modulation encoding, modulation coding set (MCS), modulation type, whether the packet as a single or multiuser frame, frame length, etc. among other possible information. This disclosure presents, among other things, a means by which a variable length second at least one SIG can be used to include any desired amount of information. By using at least one SIG that is a variable length, different amounts of information may be specified therein to adapt for any situation.

Various examples are described below for possible designs of a preamble for use in wireless communications as described herein.

FIG. 4C is a diagram illustrating another example 403 of at least one portion of an OFDM/A packet of another type. A field within the packet may be copied one or more times therein (e.g., where N is the number of times that the field is copied, and N is any positive integer greater than or equal to one). This copy may be a cyclically shifted copy. The copy may be modified in other ways from the original from which the copy is made.

FIG. 4D is a diagram illustrating another example 404 of an OFDM/A packet of a third type. In this example 404, the OFDM/A packet includes one or more fields followed by one of more first signal fields (SIG(s) 1) followed by one of more second signal fields (SIG(s) 2) followed by and one or more data field.

FIG. 4E is a diagram illustrating another example 405 of an OFDM/A packet of a fourth type. In this example 405, the OFDM/A packet includes one or more first fields followed by one of more first signal fields (SIG(s) 1) followed by one or more second fields followed by one of more second signal fields (SIG(s) 2) followed by and one or more data field.

FIG. 4F is a diagram illustrating another example 406 of an OFDM/A packet. Such a general preamble format may be backward compatible with prior IEEE 802.11 prior standards, protocols, and/or recommended practices.

In this example 406, the OFDM/A packet includes a legacy portion (e.g., at least one legacy short training field (STF) shown as L-STF, legacy signal field (SIG) shown as L-SIG) and a first signal field (SIG) (e.g., VHT [Very High Throughput] SIG (shown as SIG-A)). Then, the OFDM/A packet includes one or more other VHT portions (e.g., VHT short training field (STF) shown as VHT-STF, one or more VHT long training fields (LTFs) shown as VHT-LTF, a second SIG (e.g., VHT SIG (shown as SIG-B)), and one or more data symbols.

Various diagrams below are shown that depict at least a portion (e.g., preamble) of various OFDM/A packet designs.

FIG. 5A is a diagram illustrating another example 501 of an OFDM/A packet. In this example 501, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-AL e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a short training field (STF) based on a newer, developing, etc. communication standard, protocol, and/or recommended practice (shown as HE-STF, e.g., where HE again corresponds to high efficiency) followed by one or more fields.

FIG. 5B is a diagram illustrating another example 502 of an OFDM/A packet. In this example 502, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-AL e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a third at least one SIG based on a newer, developing, etc. communication standard, protocol, and/or recommended practice (shown as HE-SIG-A3, e.g., where HE again corresponds to high efficiency) followed by a fourth at least one SIG based on a newer, developing, etc. communication standard, protocol, and/or recommended practice (shown as HE-SIG-A4, e.g., where HE again corresponds to high efficiency) followed by a STF based on a newer, developing, etc. communication standard, protocol, and/or recommended practice (shown as HE-STF, e.g., where HE again corresponds to high efficiency) followed by one or more fields.

FIG. 5C is a diagram illustrating another example 502 of an OFDM/A packet. In this example 503, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-AL e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a third at least one SIG based on a newer, developing, etc. communication standard, protocol, and/or recommended practice (shown as HE-SIG-B, e.g., where HE again corresponds to high efficiency) followed by a STF based on a newer, developing, etc. communication standard, protocol, and/or recommended practice (shown as HE-STF, e.g., where HE again corresponds to high efficiency) followed by one or more fields. This example 503 shows a distributed SIG design that includes a first at least one SIG-A (e.g., HE-SIG-A1 and HE-SIG-A2) and a second at least one SIG-B (e.g., HE-SIG-B).

FIG. 5D is a diagram illustrating another example 504 of an OFDM/A packet. This example 504 depicts a type of OFDM/A packet that includes a preamble and data. The preamble is composed of at least one short training field (STF), at least one long training field (LTF), and at least one signal field (SIG).

In this example 504, the preamble is composed of at least one short training field (STF) that corresponds to a prior or legacy communication standard, protocol, and/or recommended practice relative to a newer, developing, etc. communication standard, protocol, and/or recommended practice (shown as L-STF(s)) followed by at least one long training field (LTF) that corresponds to a prior or legacy communication standard, protocol, and/or recommended practice relative to a newer, developing, etc. communication standard, protocol, and/or recommended practice (shown as L-LTF(s)) followed by at least one SIG that corresponds to a prior or legacy communication standard, protocol, and/or recommended practice relative to a newer, developing, etc. communication standard, protocol, and/or recommended practice (shown as L-SIG(s)) and optionally followed by a repeat (e.g., or cyclically shifted repeat) of the L-SIG(s) (shown as RL-SIG(s)) followed by another at least one SIG based on a newer, developing, etc. communication standard, protocol, and/or recommended practice (shown as HE-SIG-A, e.g., where HE again corresponds to high efficiency) followed by another at least one STF based on a newer, developing, etc. communication standard, protocol, and/or recommended practice (shown as HE-STF(s), e.g., where HE again corresponds to high efficiency) followed by another at least one LTF based on a newer, developing, etc.

communication standard, protocol, and/or recommended practice (shown as HE-LTF(s), e.g., where HE again corresponds to high efficiency) followed by at least one packet extension followed by one or more fields.

FIG. 5E is a diagram illustrating another example 505 of an OFDM/A packet. In this example 505, the preamble is composed of at least one field followed by at least one SIG that corresponds to a prior or legacy communication standard, protocol, and/or recommended practice relative to a newer, developing, etc. communication standard, protocol, and/or recommended practice (shown as L-SIG(s)) and optionally followed by a repeat (e.g., or cyclically shifted repeat) of the L-SIG(s) (shown as RL-SIG(s)) followed by another at least one SIG based on a newer, developing, etc. communication standard, protocol, and/or recommended practice (shown as HE-SIG-A, e.g., where HE again corresponds to high efficiency) followed by one or more fields.

Note that information included in the various fields in the various examples provided herein may be encoded using various encoders. In some examples, two independent binary convolutional code (BCC) encoders are implemented to encode information corresponding to different respective modulation coding sets (MCSs) that are can be selected and/or optimized with respect to, among other things, the respective payload on the respective channel. Various communication channel examples are described with respect to FIG. 7D below.

Also, in some examples, a wireless communication device generates content that is included in the various SIGs (e.g., SIGA and/or SIGB) to signal MCS(s) to one or more other wireless communication devices to instruct which MCS(s) for those one or more other wireless communication devices to use with respect to one or more communications. In addition, in some examples, content included in a first at least one SIG (e.g., SIGA) include information to specify at least one operational parameter for use in processing a second at least one SIG (e.g., SIGB) within the same OFDM/A packet.

Various OFDM/A frame structures are presented herein for use in communications between wireless communication devices and specifically showing OFDM/A frame structures corresponding to one or more resource units (RUs). Such OFDM/A frame structures may include one or more RUs. Note that these various examples may include different total numbers of sub-carriers, different numbers of data sub-carriers, different numbers of pilot sub-carriers, etc. Different RUs may also have different other characteristics (e.g., different spacing between the sub-carriers, different sub-carrier densities, implemented within different frequency bands, etc.).

FIG. 6A is a diagram illustrating an example 601 of selection among different OFDM/A frame structures for use in communications between wireless communication devices and specifically showing OFDM/A frame structures 350 corresponding to one or more resource units (RUs). This diagram may be viewed as having some similarities to allocation of sub-carriers to different users as shown in FIG. 4D and also shows how each OFDM/A frame structure is associated with one or more RUs. Note that these various examples may include different total numbers of sub-carriers, different numbers of data sub-carriers, different numbers of pilot sub-carriers, etc. Different RUs may also have different other characteristics (e.g., different spacing between the sub-carriers, different sub-carrier densities, implemented within different frequency bands, etc.).

In one example, OFDM/A frame structure 1 351 is composed of at least one RU 1 651. In another example, OFDM/A frame structure 1 351 is composed of at least one RU 1 651 and at least one RU 2 652. In another example, OFDM/A frame structure 1 351 is composed of at least one RU 1 651, at least one RU 2 652, and at least one RU m 653. Similarly, the OFDM/A frame structure 2 352 up through OFDM/A frame structure n 353 may be composed of any combinations of the various RUs (e.g., including any one or more RU selected from the RU 1 651 through RU m 653).

FIG. 6B is a diagram illustrating an example 602 of various types of different resource units (RUs). In this example 602, RU 1 651 includes A1 total sub-carrier(s), A2 data (D) sub-carrier(s), A3 pilot (P) sub-carrier(s), and A4 unused sub-carrier(s). RU 2 652 includes B1 total sub-carrier(s), B2 D sub-carrier(s), B3 P sub-carrier(s), and B4 unused sub-carrier(s). RU N 653 includes C1 total sub-carrier(s), C2 D sub-carrier(s), C3 P sub-carrier(s), and C4 unused sub-carrier(s).

Considering the various RUs (e.g., across RU 1 651 to RU N 653), the total number of sub-carriers across the RUs increases from RU 1 651 to RU N 653 (e.g., A1<B1<C1). Also, considering the various RUs (e.g., across RU 1 651 to RU N 653), the ratio of pilot sub-carriers to data sub-carriers across the RUs decreases from RU 1 651 to RU N 653 (e.g., A3/A2>B3/B2>C3/C2).

In some examples, note that different RUs can include a different number of total sub-carriers and a different number of data sub-carriers yet include a same number of pilot sub-carriers.

As can be seen, this disclosure presents various options for mapping of data and pilot sub-carriers (and sometimes unused sub-carriers that include no modulation data or are devoid of modulation data) into OFDMA frames or packets (note that frame and packet may be used interchangeably herein) in various communications between communication devices including both the uplink (UL) and downlink (DL) such as with respect to an access point (AP). Note that a user may generally be understood to be a wireless communication device implemented in a wireless communication system (e.g., a wireless station (STA) or an access point (AP) within a wireless local area network (WLAN/WiFi)). For example, a user may be viewed as a given wireless communication device (e.g., a wireless station (STA) or an access point (AP), or an AP-operative STA within a wireless communication system). This disclosure discussed localized mapping and distributed mapping of such sub-carriers or tones with respect to different users in an OFDMA context (e.g., such as with respect to FIG. 4C and FIG. 4D including allocation of sub-carriers to one or more users).

Some versions of the IEEE 802.11 standard have the following physical layer (PHY) fast Fourier transform (FFT) sizes: 32, 64, 128, 256, 512.

These PHY FFT sizes are mapped to different bandwidths (BWs) (e.g., which may be achieved using different down-clocking ratios or factors applied to a first clock signal to generate different other clock signals such as a second clock signal, a third clock signal, etc.). In many locations, this disclosure refers to FFT sizes instead of BW since FFT size determines a user's specific allocation of sub-carriers, RUs, etc. and the entire system BW using one or more mappings of sub-carriers, RUs, etc.

This disclosure presents various ways by which the mapping of N users's data into the system BW tones (localized or distributed). For example, if the system BW uses 256 FFT, modulation data for 8 different users can each use a 32 FFT, respectively. Alternatively, if the system BW uses 256 FFT, modulation data for 4 different users can each use a 64 FFT, respectively. In another alternative, if the system BW uses 256 FFT, modulation data for 2 different users can each use a 128 FFT, respectively. Also, any number of other combinations is possible with unequal BW allocated to different users such as 32 FFT to 2 users, 64 FFT for one user, and 128 FFT for the last user.

Localized mapping (e.g., contiguous sub-carrier allocations to different users such as with reference to FIG. 3D) is preferable for certain applications such as low mobility users (e.g., that remain stationary or substantially stationary and whose location does not change frequently) since each user can be allocated to a sub-band based on at least one characteristic. An example of such a characteristic includes allocation to a sub-band that maximizes its performance (e.g., highest SNR or highest capacity in multi-antenna system). The respective wireless communication devices (users) receive frames or packets (e.g., beacons, null data packet (NDP), data, etc. and/or other frame or packet types) over the entire band and feedback their preferred sub-band or a list of preferred sub-bands. Alternatively, a first device (e.g., transmitter, AP, or STA) transmits at least one OFDMA packet to a second communication device, and the second device (e.g., receiver, a STA, or another STA) may be configured to measure the first device's initial transmission occupying the entire band and choose a best/good or preferable sub-band. The second device can be configured to transmit the selection of the information to the first device via feedback, etc.

In some examples, a device is configured to employ PHY designs for 32 FFT, 64 FFT and 128 FFT as OFDMA blocks inside of a 256 FFT system BW. When this is done, there can be some unused sub-carriers (e.g., holes of unused sub-carriers within the provisioned system BW being used). This can also be the case for the lower FFT sizes. In some examples, when an FFT is an integer multiple of another, the larger FFT can be a duplicate a certain number of times of the smaller FFT (e.g., a 512 FFT can be an exact duplicate of two implementations of 256 FFT). In some examples, when using 256 FFT for system BW the available number of tones is 242 that can be split among the various users that belong to the OFDMA frame or packet (DL or UL).

In some examples, a PHY design can leave gaps of sub-carriers between the respective wireless communication devices (users) (e.g., unused sub-carriers). For example, users 1 and 4 may each use a 32 FFT structure occupying a total of 26×2=52 sub-carriers, user 2 may use a 64 FFT occupying 56 sub-carriers and user 3 may use 128 FFT occupying 106 sub-carriers adding up to a sum total of 214 sub-carriers leaving 28 sub-carriers unused.

In another example, only 32 FFT users are multiplexed allowing up to 9 users with 242 sub-carriers−(9 users×26 RUs)=8 unused sub-carriers between the users. In yet another example, for 64 FFT users are multiplexed with 242 sub-carriers−(4 users×56 RUs)=18 unused sub-carriers.

The unused sub-carriers can be used to provide better separation between users especially in the UL where users's energy can spill into each other due to imperfect time/frequency/power synchronization creating inter-carrier interference (ICI).

FIG. 7A is a diagram illustrating another example 701 of various types of different RUs. In this example 701, RU 1 includes X1 total sub-carrier(s), X2 data (D) sub-carrier(s), X3 pilot (P) sub-carrier(s), and X4 unused sub-carrier(s). RU 2 includes Y1 total sub-carrier(s), Y2 D sub-carrier(s), Y3 P sub-carrier(s), and Y4 unused sub-carrier(s). RU q includes Z1 total sub-carrier(s), Z2 D sub-carrier(s), Z3 P sub-carrier(s), and Z4 unused sub-carrier(s). In this example 701, note that different RUs can include different spacing between the sub-carriers, different sub-carrier densities, implemented within different frequency bands, span different ranges within at least one frequency band, etc.

FIG. 7B is a diagram illustrating another example 702 of various types of different RUs. This diagram shows RU 1 that includes 26 contiguous sub-carriers that include 24 data sub-carriers, and 2 pilot sub-carriers; RU 2 that includes 52 contiguous sub-carriers that include 48 data sub-carriers, and 4 pilot sub-carriers; RU 3 that includes 106 contiguous sub-carriers that include 102 data sub-carriers, and 4 pilot sub-carriers; RU 4 that includes 242 contiguous sub-carriers that include 234 data sub-carriers, and 8 pilot sub-carriers; RU 5 that includes 484 contiguous sub-carriers that include 468 data sub-carriers, and 16 pilot sub-carriers; and RU 6 that includes 996 contiguous sub-carriers that include 980 data sub-carriers, and 16 pilot sub-carriers.

Note that RU 2 and RU 3 include a first/same number of pilot sub-carriers (e.g., 4 pilot sub-carriers each), and RU 5 and RU 6 include a second/same number of pilot sub-carriers (e.g., 16 pilot sub-carriers each). The number of pilot sub-carriers remains same or increases across the RUs. Note also that some of the RUs include an integer multiple number of sub-carriers of other RUs (e.g., RU 2 includes 52 total sub-carriers, which is 2× the 26 total sub-carriers of RU 1, and RU 5 includes 242 total sub-carriers, which is 2× the 242 total sub-carriers of RU 4).

FIG. 7C is a diagram illustrating an example 703 of various types of communication protocol specified physical layer (PHY) fast Fourier transform (FFT) sizes. The device 310 is configured to generate and transmit OFDMA packets based on various PHY FFT sizes as specified within at least one communication protocol. Some examples of PHY FFT sizes, such as based on IEEE 802.11, include PHY FFT sizes such as 32, 64, 128, 256, 512, 1024, and/or other sizes.

In one example, the device 310 is configured to generate and transmit an OFDMA packet based on RU 1 that includes 26 contiguous sub-carriers that include 24 data sub-carriers, and 2 pilot sub-carriers and to transmit that OFDMA packet based on a PHY FFT 32 (e.g., the RU 1 fits within the PHY FFT 32). In one example, the device 310 is configured to generate and transmit an OFDMA packet based on RU 2 that includes 52 contiguous sub-carriers that include 48 data sub-carriers, and 4 pilot sub-carriers and to transmit that OFDMA packet based on a PHY FFT 56 (e.g., the RU 2 fits within the PHY FFT 56). The device 310 uses other sized RUs for other sized PHY FFTs based on at least one communication protocol.

Note also that any combination of RUs may be used. In another example, the device 310 is configured to generate and transmit an OFDMA packet based on two RUs based on RU 1 and one RU based on RU 2 based on a PHY FFT 128 (e.g., two RUs based on RU 1 and one RU based on RU 2 includes a total of 104 sub-carriers). The device 310 is configured to generate and transmit any OFDMA packets based on any combination of RUs that can fit within an appropriately selected PHY FFT size of at least one communication protocol.

Note also that any given RU may be sub-divided or partitioned into subsets of sub-carriers to carry modulation data for one or more users (e.g., such as with respect to FIG. 3C or FIG. 3D).

FIG. 7D is a diagram illustrating an example 704 of different channel bandwidths and relationship there between. In one example, a device (e.g., the device 310) is configured to generate and transmit any OFDMA packet based on any of a number of OFDMA frame structures within various communication channels having various channel bandwidths. For example, a 160 MHz channel may be subdivided into two 80 MHz channels. An 80 MHz channel may be subdivided into two 40 MHz channels. A 40 MHz channel may be subdivided into two 20 MHz channels. Note also such channels may be located within the same frequency band, the same frequency sub-band or alternatively among different frequency bands, different frequency sub-bands, etc.

In certain of the following diagrams, certain explicitly shown individual sub-carriers represent null tone/sub-carriers (e.g., those that include no data/information modulated thereon). Dotted lines are used to show locations of pilots (e.g., predetermined information/data modulated on these sub-carriers for use in channel estimation, characterization, etc.).

Also, different respective RUs are shown in the various OFDMA tone/sub-carrier plans of the following diagrams such that the number shown in the diagram for a given RU (e.g., 13, 26, 52, 106, 242, 484, 994, 996, etc.) indicates the number of sub-carriers therein (e.g., an RU 13 includes 13 sub-carriers, each being one-half of a RU 26 that includes 13 sub-carriers; an RU 26 includes 26 sub-carriers; an RU 52 includes 52 sub-carriers, and so on). Note the DC denotes the center of the OFDMA sub-carriers of a given OFDMA tone/sub-carrier plan (e.g., the center frequency of a given communication channel and/or those sub-carriers substantially located near the center of the OFDMA sub-carriers, with the horizontal axis showing frequency, sub-carriers (SCs), and/or bandwidth (BW)). Also, note that each respective OFDMA tone/sub-carrier plan includes multiple sub-carrier (SC) sub-plans depicted in various levels. Generally, when descending in a given OFDMA tone/sub-carrier plan, the size of the respective RUs therein increases. Note that a given SC sub-plan may include RUs of one or two or more different sized-RUs.

FIG. 8A is a diagram illustrating an example 801 of a tone/sub-carrier plan showing pilot locations therein. A $1^{st}$ SC sub-plan includes multiple RUs that includes 26 sub-carriers and one sized 26 RU that is split across DC (e.g., with one respective RU that includes 13 sub-carriers on each side of DC). A $2^{nd}$ SC sub-plan includes multiple RUs that includes 52 sub-carriers and one sized 26 RU that is split across DC (e.g., with one respective RU that includes 13 sub-carriers on each side of DC); note that each RU 52 includes those sub-carriers directly included above in 2 RU 26 located directly above in the $1^{st}$ SC sub-plan. A $3^{rd}$ SC sub-plan includes multiple RUs that includes 106 sub-carriers and one sized 26 RU that is split across DC (e.g., with one respective RU that includes 13 sub-carriers on each side of DC); note that each RU 106 includes those sub-carriers directly included above in 2 RU 52 located directly as well as 2 null sub-carriers located above in the $2^{nd}$ SC sub-plan. A $4^{th}$ SC sub-plan includes one RU that includes 242 sub-carriers and spans the OFDMA sub-carriers. In some examples, the OFDMA tone/sub-carrier plan of this diagram is based on a communication channel having a bandwidth of 20 MHz. In such a 20 MHz implementation, the unused sub-carrier locations for 26 tones RU (positive and negative indices) are as follows: 2, 3, 69, 122. As for construction of the OFDMA tone/sub-carrier plan in a 20 MHz implementation, RU-106 aligns with two RU-52 with one unused tone at end and one in the middle.

Also, the pilots (dotted lines) are shown as certain sub-carrier locations based on the numbers shown above (both positive and negative with respect to DC). As shown in the diagram, the pilots extend down thrown the various SC sub-plans at least to some extent. For example, pilots at locations +/−116, 90, 48, and 22 extend down from the $1^{st}$ SC sub-plan to the $4^{th}$ SC sub-plan. However, note that pilots at locations +/−102, 76, 62, and 36 extend down from the $1^{st}$ SC sub-plan to only the $2^{nd}$ SC sub-plan, while pilots at locations +/−10 extend down from the $1^{st}$ SC sub-plan to the $3^{rd}$ SC sub-plan. Similarly, with respect to other OFDMA sub-carrier plans described herein, the pilots and null sub-carriers are shown therein with respect to solid and dotted lines, respectively.

Note that analogous and similar principles of design are used in the following OFDMA tone/sub-carrier plans. The details are shown in the diagrams showing symmetry, construction, design, etc. of the various OFDMA tone/sub-carrier plans.

FIG. 8B is a diagram illustrating another example 802 of a tone/sub-carrier plan showing pilot locations therein. This diagram shows an OFDMA tone/sub-carrier plan with 5 SC sub-plans. Details are shown in the diagram. In some examples, the OFDMA tone/sub-carrier plan of this diagram is based on a communication channel having a bandwidth of 40 MHz. In such a 40 MHz implementation, the unused sub-carrier locations for 26 tones RU (positive and negative indices) are as follows: 3, 56, 57, 110, 137, 190, 191, 244, where 56 indicates modulo 8.

FIG. 9A is a diagram illustrating another example 901 of a tone/sub-carrier plan showing pilot locations therein. This diagram shows an OFDMA tone/sub-carrier plan with 6 SC sub-plans. Details are shown in the diagram. In some examples, the OFDMA tone/sub-carrier plan of this diagram is based on a communication channel having a bandwidth of 80 MHz. In such an 80 MHz implementation, the unused sub-carrier locations for 26 tones RU (positive and negative indices) are as follows: 17, 70, 71, 124, 151, 204, 205, 258, 259, 312, 313, 366, 393, 446, 447, 500, where 312 indicates modulo 8.

As for construction of the OFDMA tone/sub-carrier plan in a 40 MHz implementation, the design involves spreading unused tones for RU-26 and keeping alignment of two RU-26 with RU-52. As for construction of the OFDMA tone/sub-carrier plan in an 80 MHz implementation relative to the 40 MHz implementation, the design involves no change except adding a RU-26 in center of band (e.g., split into two separate RU-13 on each side of DC).

FIG. 9B is a diagram illustrating another example 902 of a tone/sub-carrier plan showing pilot locations therein. This diagram shows an OFDMA tone/sub-carrier plan with 6 SC sub-plans. Details are shown in the diagram. In some examples, the OFDMA tone/sub-carrier plan of this diagram is based on a communication channel having a bandwidth of 160 MHz, and this OFDMA tone/sub-carrier plan includes the OFDMA sub-carrier plan of FIG. 9A shown in the left hand side and the right hand side of DC across the communication channel having the bandwidth of 160 MHz.

Certain of the various OFDMA tone/sub-carrier plans include a first OFDMA sub-carrier sub-plan that includes first RUs of a first sub-carrier size and first null sub-carriers that are distributed across the OFDMA sub-carriers as well as a second OFDMA sub-carrier sub-plan that includes second RUs of a second sub-carrier size that are greater than the first sub-carrier size and a second null sub-carriers that are distributed across the OFDMA sub-carriers such that the second null sub-carriers are located in common locations as the first null sub-carriers within the OFDMA sub-carriers.

Across certain of the various OFDMA tone/sub-carrier plans designed according to the principles herein, some examples include a first OFDMA sub-carrier sub-plan that includes first RUs of a first sub-carrier size and first pilots at first locations that are substantially uniformly distributed within OFDMA sub-carriers, second OFDMA sub-carrier sub-plan that include second RUs of a second sub-carrier size that is greater than the first sub-carrier size and second pilots that includes a same number of pilots as the first pilots at second locations that are same as the first locations within the OFDMA sub-carriers, and a third OFDMA sub-carrier sub-plan that includes third RUs of a third sub-carrier size that is greater than the second sub-carrier size and third pilots that include fewer pilots than the second pilots at third locations that include a subset of the first locations within the OFDMA sub-carriers.

In certain examples, the first OFDMA sub-carrier sub-plan includes the first RUs of the first sub-carrier size and at least one other RU that is one-half the first sub-carrier size that are distributed across the OFDMA sub-carriers, the second OFDMA sub-carrier sub-plan that include the second RUs of the second sub-carrier size that is greater than the first sub-carrier size and at least one other RU that is one-half the second sub-carrier size that are distributed across the OFDMA sub-carriers, and the third OFDMA sub-carrier sub-plan that includes the third RUs of the third sub-carrier size that is greater than the second sub-carrier size and at least one other RU that is one-half the second sub-carrier size that are distributed across the OFDMA sub-carriers.

In general, with respect to the design of an OFDMA sub-carrier plan that includes multiple OFDMA sub-carrier sub-plans therein and selectively placed pilots therein, the design process begins with the OFDMA sub-carrier plan (e.g., including the various RUs of various sizes, etc. along with the placement of the null sub-carriers, etc.), then the pilot locations are selected so that they will be substantially (and/or approximately) uniformly distributed within the OFDMA sub-carriers. In addition, when dropping down within the OFDMA sub-carrier plan to additional OFDMA sub-carrier sub-plans (e.g., from $1^{st}$/top OFDMA sub-carrier sub-plan that includes relatively smallest sized RUs to a $2^{nd}/2^{nd}$ from top OFDMA sub-carrier sub-plan that includes second relatively smallest sized RUs, and so on until the bottom OFDMA sub-carrier sub-plan that includes the relatively largest sized RU(s) in the OFDMA sub-carrier plan), note that all of the pilot locations do not necessarily extend all the way from the $1^{st}$/top OFDMA sub-carrier sub-plan to the bottom OFDMA sub-carrier sub-plan at every location. Note that some of the pilot locations extend down into the OFDMA sub-carrier sub-plan to only a particular depth (e.g., extend from $1^{st}$/top OFDMA sub-carrier sub-plan to the $2^{nd}/2^{nd}$ from top OFDMA sub-carrier sub-plan, or extend from $1^{st}$ hop OFDMA sub-carrier sub-plan to the $n^{th}/n^{th}$ from top OFDMA sub-carrier sub-plan, and so on).

The design process is such that when dropping down within the OFDMA sub-carrier plan, and considering that the pilot locations have been selected to be spread substantially (and/or approximately) uniformly and/or evenly within the OFDMA sub-carriers, then the design is such that the structure is symmetrical (e.g., when mirrored/flipped, from right (R) to left (L), etc.) so that the overall structure, from OFDMA sub-carrier sub-plan to OFDMA sub-carrier sub-plan across the OFDMA sub-carrier sub-plan, does not have large gaps therein without any pilots.

In addition, as extending down the OFDMA sub-carrier sub-plans within the OFDMA sub-carrier sub-plan, the number of pilots within the OFDMA sub-carrier sub-plans can decrease as the size of the RUs of the OFDMA sub-carrier sub-plans increase (e.g., fewer pilots within OFDMA sub-carrier sub-plans that include relatively larger sized RUs). For example, in certain OFDMA sub-carrier plans herein, a RU-106 includes 102 sub-carriers that carry data and 4 pilots (e.g., pilots carry no data but instead carry predetermined pilot information therein for use in performing channel estimation). In certain OFDMA sub-carrier plans herein, a RU-242 includes 234 sub-carriers that carry data and 8 pilots. Similarly, as can be seen in the diagrams of various OFDMA sub-carrier plans herein, as the size of the RUs increase within a given OFDMA sub-carrier plan, the number of pilots within such larger RUs decreases.

Note also that even when dropping pilots across the OFDMA sub-carrier sub-plans within an OFDMA sub-carrier plan as RU size increases within the OFDMA sub-carrier plan, the design operates by trying to maintain the pilots substantially (and/or approximately) uniformly and/or evenly spread sub-carriers across the OFDMA sub-carriers bandwidth while trying to keep even spacing (as much as possible) of the pilots and while also keep pilots in same locations (e.g., not moving locations across the OFDMA sub-carrier sub-plans within an OFDMA sub-carrier plan).

Also, when having a predetermined design and location of such pilots across the OFDMA sub-carrier plan, then when a WDEV is tracking a signal, that WDEV operate by tracking only the pilots within an RU assigned to it (e.g., only tracking those pilots within one or more RUs assigned to that for use in communications) or the WDEV can track pilots across all of the OFDMA sub-carriers (e.g., across the whole communication channel, the whole bandwidth, etc.). Also, note that a design trade-off can be made when moving to OFDMA sub-carrier sub-plans having relatively larger sized RUs by maintaining a common structure and symmetry and having less than perfectly uniform coverage of pilots.

In some prior IEEE 802.11 standards, protocols, and/or recommended practices, (e.g., the current IEEE 802.11ac design), the tones/sub-carriers used for channel feedback (e.g., compressed beamforming feedback) with Ng>1 are even values/numbered tons/sub-carriers. For example for 80 MHz, the tones/sub-carriers used for feedback with Ng=2 are [−122, −120, −118, −116, −114, −112, −110, −108, −106, −104, −102, −100, −98, −96, −94, −92, −90, −88, −86, −84, −82, −80, −78, −76, −74, −72, −70, −68, −66, −64, −62, −60, −58, −56, −54, −52, −50, −48, −46, −44, −42, −40, −38, −36, −34, −32, −30, −28, −26, −24, −22, −20, −18, −16, −14, −12, −10, −8, −6, −4, −2, 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116, 118, 120, 122]

The tones/sub-carriers used for feedback with Ng=4 are [−122, −118, −114, −110, −106, −102, −98, −94, −90, −86, −82, 78, −74, −70, −66, −62, −58, −54, −50, −46, −42, −38, −34, −30, −26, −22, −18, −14, −10, −6, −2, 2, 6, 10, 14, 18, 22, 26, 30, 34, 38, 42, 46, 50, 54, 58, 62, 66, 70, 74, 78, 82, 86, 90, 94, 98, 102, 106, 110, 114, 118, 122]

However, note that when operating in accordance with IEEE 802.11ax, pilots occupy even tones and can't directly be used for compressed channel feedback (e.g., such as with respect to the example 801 for 20 MHz shown with reference to FIG. 8A).

This disclosure proposes several solutions for various bandwidths (BWs) including BW=20, 40, 80 MHz. Note that other sized BW(s) (e.g., 160 MHz, and/or any other size of BW) may be constructed following the same design solutions.

Solution A

In this option, the beamformee (e.g., receiver, wireless station (STA) receiving a signal from an access point (AP)

or another STA, an access point (AP) receiving a signal from another AP or a STA) still uses the same sub-carrier/tone locations for feedback (e.g., the sub-carriers/tones with even indices descried above tones/sub-carriers used for feedback), but in order to generate the feedback on the pilot sub-carriers/tones, it measures the channel on adjacent sub-carriers/tones and interpolates them to arrive at the required estimate.

Note that if the null data packet (NDP) packet uses a 4×LTF (the LTF occupies all sub-carriers/tones) then adjacent tones to the pilot sub-carriers/tones can be used to estimate the channel on the pilot sub-carriers/tones.

Note that if the NDP packet uses a 2×LTF (the LTF occupies only even sub-carriers/tones) then adjacent even sub-carriers/tones to the pilot sub-carriers/tones can be used to estimate the channel on the pilot sub-carriers/tones.

Solution B

In this option, the beamformee (e.g., receiver, wireless station (STA) receiving a signal from an access point (AP) or another STA, an access point (AP) receiving a signal from another AP or a STA) transfers the interpolation burden to the beamformer by directly feeding back the channel in the adjacent sub-carriers/tones to the pilots. In this case the AP carries out the interpolation.

Note that in this case the feedback overhead increases by the number of pilots (instead of feeding back the pilot locations, feeding back two locations around):

For 20 MHz there are 8 pilots and 122 locations for Ng=2, 62 locations for Ng=4, 32 locations for Ng=8 [−122:8:−2, 2:8:122]—increasing to 130 locations, 70 and 40 locations respectively (6.5%, 13%, 25% increase).

For 40 MHz there are 16 pilots and 242 locations for Ng=2, 122 locations for Ng=4 and 62 locations for Ng=8 [−244:8:−4, 4:8:244]—increasing to 258 locations, 138 and 78 locations respectively (6.5%, 13% and 25% increase).

For 80 MHz there are 16 pilots and 498 locations for Ng=2, 250 locations for Ng=4 and 126 locations for Ng=8 [−500:9:−4 4:8:500]—increasing to 514 locations, 266 and 142 locations respectively (3.2%, 6.4% and 12.7% increase).

Solution C

In this option, the beamformee (e.g., receiver, wireless station (STA) receiving a signal from an access point (AP) or another STA, an access point (AP) receiving a signal from another AP or a STA) skips the pilot sub-carriers/tones in the feedback sequence. That means effectively that an Ng=2 feedback has several locations (equal to the number of pilots) with a gap of 4 sub-carriers/tones hence with performance slightly worse than Ng=2 and similarly an Ng=4 has several locations (not all locations collide with pilots) with a gap of 8 sub-carriers/tones hence with performance slightly worse than Ng=4.

Solution D

In this option, the feedback locations are moved to odd sub-carriers/tones thus avoiding all the pilot locations but with some edge inefficiencies.

For 20 MHz for Ng=2 [−121:2:−3, 3:2:121] with edge sub-carriers/tones [−122 −2 2 122] could be added for improved performance, for Ng=4 [−121:4:−5, 5:4:121] with edge sub-carriers/tones [−122 −3 −2 2 3 122] could be added, Ng=8 [−121:8:−9, 9:8:122] with edge sub-carriers/tones [−122 −3 3 122] could be added.

For 40 MHz for Ng=2 [−243:2:−3, 3:2:243], for Ng=4 [−243:4:−3, 3:4:243], for Ng=8 [−243:8:−3, 3:8:243] with edge sub-carriers/tones [−244 244] could be added.

For 80 MHz for Ng=2 [−499:2:−3, 3:2:499], for Ng=4 [−499:4:−3, 3:4:499], for Ng=8 [−499:8:−3, 3:8:499] with edge sub-carriers/tones [−500 500] could be added.

Roster of Feedback Tones for Next Generation (e.g., Developing IEEE 802.11Ax)

Certain standards, protocols, and/or recommended practices (e.g., the developing IEEE 802.11ax) have adopted the roster of tones, shown in the table below, for compressed beamforming feedback. The roster depends on the null data packet (NDP) Bandwidth (BW) and the tone grouping factor (Ng). This table may be viewed as being an example of a sub-carrier roster look up table (LUT) that specifies sets of feedback sub-carrier locations based on sub-carrier or tone grouping factors and the communication channel bandwidths.

Since the feedback tones are even (e.g., on sub-carriers/tones with even indices), some of them coincide with pilots. At the pilot tones, the STA interpolates the channel from neighboring tones before feeding back. Copying the channel on the nearest tone (or one of the nearest tones, if there are multiple nearest tones) is a special case of interpolation.

TABLE 1

| Roster of tones for feedback | | |
|---|---|---|
| | Ng = 4 | Ng = 16 |
| BW = 20 MHz | [−122, −120:4:−4, −2, 2, 4:4:120, 122] | [−122, −116:16:−4, −2, 2, 4:16:116, 122] |
| BW = 40 MHz | [−244:4:−4, 4:4:244] | [−244:16:−4, 4:16:244] |
| BW = 80 MHz | [−500:4:−4, 4:4:500] | [−500:16:−4, 4:16:500] |

Feedback Scheme with OFDMA

When a beamformer (e.g., an AP) wants feedback over bands smaller than the NDP bandwidth, 11ax has adopted the following scheme: the beamformer (e.g., AP) will signal the start and end 26 tone RUs that cover the desired bandwidth.

Using a table, this disclosure defines a start tone associated with each start 26 RU and an end tone associated with each end 26 RU. The table depends on the NDP BW and Ng.

The beamformee (e.g., an STA) feeds back all tones from the roster that fall between the start and end tones obtained from the table (the beamformer (e.g., AP) also signals the tone grouping factor Ng needed to choose the right table)

TABLE 2a

| Feedback for Ng = 4 | | | | | |
|---|---|---|---|---|---|
| 80 MHz 26 RU | 80 MHz (S,E) FB tone | 40 MHz 26 RU | 40 MHz (S,E) FB tone | 20 MHz 26 RU | 20 MHz (S,E) FB tone |
| 1 | −500, −472 | 1 | = (S,E) for | | |
| 2 | −476, −448 | 2 | 80 MHz + | | |
| 3 | −448, −420 | 3 | 256 | | |
| 4 | −420, −392 | 4 | | | |
| 5 | −392, −364 | 5 | | | |
| 6 | −368, −340 | 6 | | | |
| 7 | −340, −312 | 7 | | | |
| 8 | −312, −284 | 8 | | | |
| 9 | −288, −260 | 9 | | | |
| 10 | −260, −232 | | | | |
| 11 | −232, −204 | | | | |
| 12 | −204, −176 | | | | |
| 13 | −180, −152 | | | | |
| 14 | −152, −124 | | | | |
| 15 | −124, −96 | | | 1 | −122,−96 |
| 16 | −100, −72 | | | 2 | = (S,E) for |
| 17 | −72, −44 | | | 3 | 80 MHz + 4 |
| 18 | −44, −16 | | | 4 | = (S,E) for |
| 19 | −16, 16 | | | 5 | 80 MHz |
| 20 | 16, 44 | | | 6 | |

TABLE 2a-continued

Feedback for Ng = 4

| 80 MHz 26 RU | 80 MHz (S,E) FB tone | 40 MHz 26 RU | 40 MHz (S,E) FB tone | 20 MHz 26 RU | 20 MHz (S,E) FB tone |
|---|---|---|---|---|---|
| 21 | 44, 72 | | | 7 | = (S,E) for 80 MHz − 4 |
| 22 | 72, 100 | | | 8 | |
| 23 | 96, 124 | | | 9 | 96, 122 |
| 24 | 124, 152 | | | | |
| 25 | 152, 180 | | | | |
| 26 | 176, 204 | | | | |
| 27 | 204, 232 | | | | |
| 28 | 232, 260 | | | | |
| 29 | 260, 288 | 10 | = (S,E) for 80 MHz − 256 | | |
| 30 | 284, 312 | 11 | | | |
| 31 | 312, 340 | 12 | | | |
| 32 | 340, 368 | 13 | | | |
| 33 | 364, 392 | 14 | | | |
| 34 | 392, 420 | 15 | | | |
| 35 | 420, 448 | 16 | | | |
| 36 | 448, 476 | 17 | | | |
| 37 | 472, 500 | 18 | | | |

1. Application of Table 2a above
   a. beamformer (e.g., AP) signals start and end (S, E) 26 RU
   b. Pick the s tone for the start RU and the e tone for the end 26 RU from Table 2a
   c. Feedback all tones from the feedback roster (Table 1) between the S and E tones picked in step 1b
2. The tones fed back are symmetric around the DC tone TABLE 2b Feedback for Ng =16

| 80 MHz 26 RU | 80 MHz (S,E) FB tone | 40 MHz 26 RU | 40 MHz (S,E) FB tone | 20 MHz 26 RU | 20 MHz (S,E) FB tone |
|---|---|---|---|---|---|
| 1 | −500, −468 | 1 | = (S,E) for 80 MHz + 256 | | |
| 2 | −484, −436 | 2 | | | |
| 3 | −452, −420 | 3 | | | |
| 4 | −420, −388 | 4 | | | |
| 5 | −404, −356 | 5 | | | |
| 6 | −372, −340 | 6 | | | |
| 7 | −340, −308 | 7 | | | |
| 8 | −324, −276 | 8 | | | |
| 9 | −292, −260 | 9 | | | |
| 10 | −260, −228 | | | | |
| 11 | −244, −196 | | | | |
| 12 | −212, −164 | | | | |
| 13 | −180, −148 | | | | |
| 14 | −164, −116 | | | | |
| 15 | −132, −84 | | | 1 | −122, −84 |
| 16 | −100, −68 | | | 2 | = (S,E) for 80 MHz |
| 17 | −84, −36 | | | 3 | −68, −36 |
| 18 | −52, −4 | | | 4 | |
| 19 | −20, 20 | | | 5 | = (S,E) for 80 MHz |
| 20 | 4, 52 | | | 6 | |
| 21 | 36, 84 | | | 7 | 36, 68 |
| 22 | 68, 100 | | | 8 | = (S,E) for 80 MHz |
| 23 | 84, 132 | | | 9 | 84, 122 |
| 24 | 116, 164 | | | | |
| 25 | 148, 180 | | | | |
| 26 | 164, 212 | | | | |
| 27 | 196, 244 | | | | |
| 28 | 228, 260 | | | | |
| 29 | 260, 292 | 10 | = (S,E) for 80 MHz − 256 | | |
| 30 | 276, 324 | 11 | | | |
| 31 | 308, 340 | 12 | | | |
| 32 | 340, 372 | 13 | | | |
| 33 | 356, 404 | 14 | | | |
| 34 | 388, 420 | 15 | | | |
| 35 | 420, 452 | 16 | | | |
| 36 | 436, 484 | 17 | | | |
| 37 | 468, 500 | 18 | | | |

1. Application of Table 2b above
   a. AP signals start and end (S, E) 26 RU
   b. Pick the s tone for the start RU and the e tone for the end 26 RU from Table 2b
   c. Feedback all tones from the feedback roster (Table 1) between the S and E tones picked in step 1b
2. The tones fed back are symmetric around the DC tone Various principles used in such table design (e.g., for a sub-carrier roster look up table (LUT) that specifies sets of feedback sub-carrier locations based on sub-carrier or tone grouping factors and the communication channel bandwidths) are provided below.

Extrapolation Minimized:

For many start 26 RUs, the start tone in the table does not lie within the RU, but is in an RU to the "left" (i.e., smaller index). Similarly, for many end 26 RUs, the end tone falls in an RU to the "right" (i.e., larger index). This operates to ensure that channel estimates on all tones inside the [start, end] 26 RUs can be obtained by interpolation and don't need extrapolation.

Roster Design:

The feedback tone locations are aligned for all NDP bandwidths (i.e., the roster for 40 MHz is a subset of the roster for 80 MHz. The roster for 20 MHz is a subset of the roster for 40 MHz, except for the edge tones ±2, ±122).

Exploiting Symmetries to Condense the Table:

The 26 tone RU locations with 40 MHz NDPs are shifted versions of the 26 tone RU locations with 80 MHz NDPs (the shift is ±256, depending on whether the tones are negative or positive).

Similarly, close to DC, the 26 tone RU locations with 20 MHz NDP are identical to the 26 tone RU locations with 80 MHz NDP.

The design exploits these symmetries and the fact that the feedback tone locations are aligned for all bandwidths to reduce the number of entries in the table.

To do this, the design expresses the (start, end) tones with 20/40 MHz NDPs as shifted versions of the (start, end) tones with 80 MHz NDPs and only note down the shifts.

FIG. 10A is a diagram illustrating an example 1001 of a set of feedback sub-carrier (SC) locations. Such a set of feedback SC locations may be determined by a wireless communication device by processing an NDP announcement frame to identify the set of feedback sub-carrier locations based on the sub-carrier or tone grouping factor and the communication channel bandwidth specified within the NDP announcement frame as applied to a sub-carrier roster look up table (LUT) that specifies sets of feedback sub-carrier locations based on a plurality of sub-carrier or tone grouping factors and the plurality of communication channel bandwidths. Them, once the set of feedback sub-carrier locations is known for the particular instance, the wireless communication device can process an NDP sounding frame to generate the beamforming feedback by estimating the communication channel for each sub-carrier location within the set of feedback sub-carrier locations and then transmit a beamforming feedback frame (and/or UL OFDMA frame) to the other wireless communication device that includes estimates of the communication channel for the each sub-carrier location within the set of feedback sub-carrier locations as part of the UL OFDMA frame at or during the time specified within the trigger frame. In some examples, the wireless communication device may transmit such a UL OFDMA frame at or during the time specified within a previously received trigger frame.

FIG. 10B is a diagram illustrating an example 1002 of a feedback SC location coinciding with a pilot. When this situation occurs in some examples, then for a feedback sub-carrier location within the set of feedback sub-carrier locations that coincides with a pilot at least one of the predetermined locations of the pilots, a wireless communication device operates process the NDP sounding frame to generate the beamforming feedback for a feedback sub-carrier location within the set of feedback sub-carrier locations that coincides with the pilot at the predetermined location by interpolating estimates of the communication channel at two sub-carrier locations adjacent to the pilot.

In some examples, this involves interpolating using estimates of the communication channel at adjacently located sub-carriers (e.g., one on each side). However, note that estimates of the communication channel at any nearby and/or associated sub-carrier locations may alternatively be used (e.g., using estimate(s) of the communication channel at sub-carrier(s) not adjacently located but instead nearby to the pilot).

FIG. 10C is a diagram illustrating another example 1003 of a feedback SC location coinciding with a pilot. When this situation occurs in some examples, then for a feedback sub-carrier location within the set of feedback sub-carrier locations that coincides with a pilot of the set of pilots at the predetermined locations, process the NDP sounding frame to generate the beamforming feedback for a feedback sub-carrier location within the set of feedback sub-carrier locations that coincides with the pilot at the predetermined location by copying an estimate of the communication channel from a sub-carrier location that is adjacent to the pilot.

In some examples, this involves copying an estimate the communication channel at an adjacently located sub-carrier (e.g., on one of the sides of the pilot). However, note that another estimate of the communication channel at any nearby and/or associated sub-carrier locations may alternatively be used (e.g., copying an estimate the communication channel at a sub-carrier not adjacently located but instead nearby to the pilot, such as that there may be one or more intervening sub-carriers between the pilot and the sub-carrier location from which the estimate the communication channel is copied).

FIG. 10D is a diagram illustrating an example 1004 of feedback SC locations for different respective channel bandwidths (BWs). In this diagram, different respective communication channel bandwidths are shown. In some examples, a smaller communication channel bandwidth may include a corresponding set of feedback sub-carrier locations that is a subset of another corresponding set of feedback sub-carrier locations associated with a larger bandwidth. For example, a first communication channel bandwidth includes a 20 MHz communication channel bandwidth and a first corresponding set of feedback sub-carrier locations, a second communication channel bandwidth includes a 40 MHz communication channel bandwidth and a second corresponding set of feedback sub-carrier locations that is a subset of the first corresponding set of feedback sub-carrier locations, and a third communication channel bandwidth includes a 80 MHz communication channel bandwidth and a third corresponding set of feedback sub-carrier locations that is a subset of the second corresponding set of feedback sub-carrier locations.

FIG. 10E is a diagram illustrating an embodiment of a method 1005 for execution by one or more wireless communication devices. The method 1005 operates in step 1010 by receiving (e.g., via a communication interface of the wireless communication device) via a communication channel, and from another wireless communication device, a null data packet (NDP) announcement frame that specifies a sub-carrier or tone grouping factor, a communication channel bandwidth (of a number of possible or optional communication channel bandwidths), and at least one wireless communication device to respond to the other wireless communication device with beamforming feedback.

The method 1005 continues in step 1020 by processing the NDP announcement frame (e.g., NDP-A) to determine if the NDP announcement frame specifies the wireless communication device to respond, and when it is not determined that the NDP announcement frame specifies the wireless communication device is to respond to the other wireless communication device with the beamforming feedback in step 1030 (e.g., compares unfavorably that the wireless communication device is to respond), the method 1005 may end.

Alternatively when it is determined that the NDP announcement frame specifies the wireless communication device is to respond to the other wireless communication device with the beamforming feedback in step 1030 (e.g., compares favorably that the wireless communication device is to respond), the method 1005 then operates in step 1040 by receiving (e.g., via the communication interface of the wireless communication device, via the communication channel, and from the other wireless communication device) a NDP sounding frame that includes a long training fields (LTFs) and pilots at predetermined locations. Such predetermined locations for the pilots may be based on an OFDMA sub-carrier plan such as in accordance with any of the various examples described herein of their equivalents (e.g., such as with respect to FIG. 8A, FIG. 8B, FIG. 9A, and/or FIG. 9B).

The method 1005 then operates in step 1050 identifying a set of feedback sub-carrier locations based on the sub-carrier or tone grouping factor and the communication channel bandwidth specified within the NDP announcement frame as applied to a sub-carrier roster look up table (LUT) that specifies sets of feedback sub-carrier locations based on a plurality of sub-carrier or tone grouping factors and the plurality of communication channel bandwidths. The method 1005 then operates in step 1060 by processing the NDP sounding frame to generate the beamforming feedback by estimating the communication channel for each sub-carrier location within the set of feedback sub-carrier locations. Then, the method 1005 then operates in step 1070 by transmitting (e.g., via the communication interface of the wireless communication device) a beamforming feedback frame to the other wireless communication device that includes estimates of the communication channel for each sub-carrier location within the set of feedback sub-carrier locations.

It is noted that the various operations and functions described within various methods herein may be performed within a wireless communication device (e.g., such as by the processing circuitry 330, communication interface 320, and memory 340 or processing circuitry 330a and/or processing circuitry 330b such as described with reference to FIG. 2B) and/or other components therein. Generally, a communication interface and processing circuitry (or alternatively a processing circuitry that includes communication interface functionality, components, circuitry, etc.) in a wireless communication device can perform such operations.

Examples of some components may include one or more baseband processing modules, one or more media access control (MAC) layer components, one or more physical layer (PHY) components, and/or other components, etc. For example, such a processing circuitry can perform baseband processing operations and can operate in conjunction with a radio, analog front end (AFE), etc. The processing circuitry can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processing circuitry in a first device and another processing circuitry within a second device. In other embodiments, such processing is performed wholly by a processing circuitry within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" or their equivalents may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processing circuitries, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, a processing circuitry, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. An access point (AP) comprises:
   a communication interface; and
   processing circuitry that is coupled to the communication interface, wherein at least one of the communication interface or the processing circuitry is configured to:
   transmit, within a null data packet (NDP) announcement frame via a communication channel to a wireless communication device, a set of feedback sub-carrier locations based on a sub-carrier or tone grouping factor and a communication channel bandwidth of a plurality of communication channel bandwidths;
   transmit, via the communication channel to the wireless communication device, an NDP sounding frame that includes a plurality of long training fields (LTFs) and a plurality of pilots at predetermined locations; and
   receive, via the communication channel from the wireless communication device, a beamforming feedback frame that includes estimates of the communication channel for each sub-carrier location within the set of feedback sub-carrier locations based on the NDP sounding frame.

2. The access point of claim 1, wherein the NDP announcement frame specifies at least one wireless communication device to respond to the AP with beamforming feedback.

3. The access point of claim 1, wherein the at least one of the communication interface or the processing circuitry is further configured to transmit, within the null data packet (NDP) announcement frame via the communication channel to a plurality of wireless communication devices, the set of feedback sub-carrier locations based on the sub-carrier or tone grouping factor and the communication channel bandwidth of the plurality of communication channel bandwidths; and
   wherein the NDP announcement frame specifies at least two wireless communication devices to respond to the AP with beamforming feedback.

4. The access point of claim 3, wherein the set of feedback sub-carrier locations based on the sub-carrier or tone grouping factor and the communication channel bandwidth of the plurality of communication channel bandwidths includes specific feedback sub-carrier locations assigned to each of the at least two wireless communication devices.

5. The access point of claim 1, wherein the set of feedback sub-carrier locations are based on the sub-carrier or tone grouping factor and the communication channel bandwidth of the plurality of communication channel bandwidths specified within the NDP announcement frame based on a sub-carrier roster look up table (LUT) that specifies sets of feedback sub-carrier locations based on a plurality of sub-carrier or tone grouping factors and the plurality of communication channel bandwidths.

6. The access point of claim 5, wherein the sub-carrier roster LUT specifies, for each of the plurality of sub-carrier or tone grouping factors:
   a first communication channel bandwidth of the plurality of communication channel bandwidths that includes a 20 MHz communication channel bandwidth and a first corresponding set of feedback sub-carrier locations;
   a second communication channel bandwidth of the plurality of communication channel bandwidths includes a 40 MHz communication channel bandwidth and a second corresponding set of feedback sub-carrier locations that is a subset of the first corresponding set of feedback sub-carrier locations; and
   a third communication channel bandwidth of the plurality of communication channel bandwidths includes a 80 MHz communication channel bandwidth and a third corresponding set of feedback sub-carrier locations that is a subset of the second corresponding set of feedback sub-carrier locations.

7. The access point of claim 1, wherein the plurality of pilots at predetermined locations is based on an OFDMA sub-carrier plan that is characterized by:
   a first OFDMA sub-carrier sub-plan that includes a first plurality of resource units (RUs) of a first sub-carrier size and a first plurality of pilots at first locations that are substantially uniformly distributed within a plurality of OFDMA sub-carriers;
   a second OFDMA sub-carrier sub-plan that includes a second plurality of RUs of a second sub-carrier size that is greater than the first sub-carrier size and a second plurality of pilots that includes a same number of pilots as the first plurality of pilots at second locations that are same as the first locations within the plurality of OFDMA sub-carriers; and
   a third OFDMA sub-carrier sub-plan that includes a third plurality of RUs of a third sub-carrier size that is greater than the second sub-carrier size and a third plurality of pilots that includes fewer pilots than the second plurality of pilots at third locations that include a subset of the first locations within the plurality of OFDMA sub-carriers.

8. An access point (AP) comprising:
a communication interface; and
processing circuitry that is coupled to the communication interface, wherein at least one of the communication interface or the processing circuitry configured to:
transmit a null data packet (NDP) announcement frame, via a communication channel to a plurality of wireless communication devices, including a set of feedback sub-carrier locations including a sub-carrier or tone grouping factor and a communication channel bandwidth of a plurality of communication channel bandwidths based on a sub-carrier roster look up table (LUT) that specifies sets of feedback sub-carrier locations for specified ones of the plurality of wireless communication devices based on a plurality of sub-carrier or tone grouping factors and the plurality of communication channel bandwidths;
transmit, via a communication channel to the plurality of wireless communication devices, a null data packet (NDP) sounding frame that includes a plurality of long training fields (LTFs) and a plurality of pilots at predetermined locations;
transmit, via a communication channel to the plurality of wireless communication devices, a trigger frame that specifies a time at which to respond to the AP with beamforming feedback in an uplink (UL) OFDMA frame and the specified ones of the plurality of wireless communication devices included in the NDP announcement frame that are to respond to the AP with beamforming feedback; and
receive, via the communication channel, a beamforming feedback frame that includes estimates of the communication channel for each sub-carrier location within the set of feedback sub-carrier locations as part of the UL OFDMA frame at or during the time specified within the trigger frame.

9. The access point of claim 8, wherein the set of feedback sub-carrier locations based on the sub-carrier or tone grouping factor and the communication channel bandwidth of the plurality of communication channel bandwidths includes specific feedback sub-carrier locations assigned to each of the specified ones of the plurality of wireless communication devices.

10. The access point (AP) of claim 8, wherein the sub-carrier roster LUT specifies, for each of the plurality of sub-carrier or tone grouping factors:
a first communication channel bandwidth of the plurality of communication channel bandwidths that includes a 20 MHz communication channel bandwidth and a first corresponding set of feedback sub-carrier locations;
a second communication channel bandwidth of the plurality of communication channel bandwidths includes a 40 MHz communication channel bandwidth and a second corresponding set of feedback sub-carrier locations that is a subset of the first corresponding set of feedback sub-carrier locations; and
a third communication channel bandwidth of the plurality of communication channel bandwidths includes a 80 MHz communication channel bandwidth and a third corresponding set of feedback sub-carrier locations that is a subset of the second corresponding set of feedback sub-carrier locations.

11. The access point (AP) of claim 8, wherein the plurality of pilots at predetermined locations is based on an OFDMA sub-carrier plan that is characterized by:
a first OFDMA sub-carrier sub-plan that includes a first plurality of resource units (RUs) of a first sub-carrier size and a first plurality of pilots at first locations that are substantially uniformly distributed within a plurality of OFDMA sub-carriers;
a second OFDMA sub-carrier sub-plan that includes a second plurality of RUs of a second sub-carrier size that is greater than the first sub-carrier size and a second plurality of pilots that includes a same number of pilots as the first plurality of pilots at second locations that are same as the first locations within the plurality of OFDMA sub-carriers; and
a third OFDMA sub-carrier sub-plan that includes a third plurality of RUs of a third sub-carrier size that is greater than the second sub-carrier size and a third plurality of pilots that includes fewer pilots than the second plurality of pilots at third locations that include a subset of the first locations within the plurality of OFDMA sub-carriers.

12. A method for execution by an access point (AP), the method comprising:
transmit, within a null data packet (NDP) announcement frame via a communication channel to a wireless communication device, a set of feedback sub-carrier locations based on a sub-carrier or tone grouping factor and a communication channel bandwidth of a plurality of communication channel bandwidths;
transmit, via the communication channel to the wireless communication device, an NDP sounding frame that includes a plurality of long training fields (LTFs) and a plurality of pilots at predetermined locations; and
receive, via the communication channel from the wireless communication device, a beamforming feedback frame that includes estimates of the communication channel for each sub-carrier location within the set of feedback sub-carrier locations based on the NDP sounding frame.

13. The method of claim 12, wherein the NDP announcement frame specifies at least one wireless communication device to respond to the AP with beamforming feedback.

14. The method of claim 12 further comprises transmitting, within the null data packet (NDP) announcement frame via the communication channel to a plurality of wireless communication devices, the set of feedback sub-carrier locations based on the sub-carrier or tone grouping factor and the communication channel bandwidth of the plurality of communication channel bandwidths; and
wherein the NDP announcement frame specifies at least two wireless communication devices to respond to the AP with beamforming feedback.

15. The method of claim 14, wherein the set of feedback sub-carrier locations based on the sub-carrier or tone grouping factor and the communication channel bandwidth of the plurality of communication channel bandwidths includes specific feedback sub-carrier locations assigned to each of the at least two wireless communication devices.

16. The method of claim 12, wherein the set of feedback sub-carrier locations are based on the sub-carrier or tone grouping factor and the communication channel bandwidth of the plurality of communication channel bandwidths specified within the NDP announcement frame based on a sub-carrier roster look up table (LUT) that specifies sets of feedback sub-carrier locations based on a plurality of sub-carrier or tone grouping factors and the plurality of communication channel bandwidths.

17. The method of claim 16, wherein the sub-carrier roster LUT specifies, for each of the plurality of sub-carrier or tone grouping factors:
- a first communication channel bandwidth of the plurality of communication channel bandwidths that includes a 20 MHz communication channel bandwidth and a first corresponding set of feedback sub-carrier locations;
- a second communication channel bandwidth of the plurality of communication channel bandwidths includes a 40 MHz communication channel bandwidth and a second corresponding set of feedback sub-carrier locations that is a subset of the first corresponding set of feedback sub-carrier locations; and
- a third communication channel bandwidth of the plurality of communication channel bandwidths includes a 80 MHz communication channel bandwidth and a third corresponding set of feedback sub-carrier locations that is a subset of the second corresponding set of feedback sub-carrier locations.

18. The method of claim 12, wherein the plurality of pilots at predetermined locations is based on an OFDMA sub-carrier plan that is characterized by:
- a first OFDMA sub-carrier sub-plan that includes a first plurality of resource units (RUs) of a first sub-carrier size and a first plurality of pilots at first locations that are substantially uniformly distributed within a plurality of OFDMA sub-carriers;
- a second OFDMA sub-carrier sub-plan that includes a second plurality of RUs of a second sub-carrier size that is greater than the first sub-carrier size and a second plurality of pilots that includes a same number of pilots as the first plurality of pilots at second locations that are same as the first locations within the plurality of OFDMA sub-carriers; and
- a third OFDMA sub-carrier sub-plan that includes a third plurality of RUs of a third sub-carrier size that is greater than the second sub-carrier size and a third plurality of pilots that includes fewer pilots than the second plurality of pilots at third locations that include a subset of the first locations within the plurality of OFDMA sub-carriers.

* * * * *